United States Patent
Canova, Jr.

(10) Patent No.: US 7,289,083 B1
(45) Date of Patent: Oct. 30, 2007

(54) MULTI-SIDED DISPLAY FOR PORTABLE COMPUTER

(75) Inventor: Francis Canova, Jr., Fremont, CA (US)

(73) Assignee: Palm, Inc., Sunnyvale, CA (US)

( * ) Notice: Subject to any disclaimer, the term of this patent is extended or adjusted under 35 U.S.C. 154(b) by 569 days.

(21) Appl. No.: 09/728,023

(22) Filed: Nov. 30, 2000

(51) Int. Cl.
G09G 5/00 (2006.01)

(52) U.S. Cl. ............... 345/1.1; 345/1.2; 345/2.2; 345/5

(58) Field of Classification Search ........ 345/1.1, 345/1.3, 1.2, 3.1, 707, 733, 764, 769, 903, 345/2.2, 5, 87; 178/18.01–18.11, 19.01–19.07; 361/681–683; 455/349, 566
See application file for complete search history.

(56) References Cited

U.S. PATENT DOCUMENTS

| | | | |
|---|---|---|---|
| 4,429,478 A * | 2/1984 | Bruce-Sanders | 40/447 |
| 5,696,982 A * | 12/1997 | Tanigawa et al. | 345/1.1 |
| 5,949,643 A * | 9/1999 | Batio | 361/681 |
| 6,017,584 A | 1/2000 | Albert et al. | 427/213.3 |
| 6,057,814 A | 5/2000 | Kalt | 345/58 |
| 6,069,593 A * | 5/2000 | Lebby et al. | 345/1.1 |
| 6,118,426 A | 9/2000 | Albert et al. | 345/107 |
| 6,144,358 A * | 11/2000 | Narayanaswamy et al. | 345/102 |
| 6,229,502 B1 * | 5/2001 | Schwab | 345/1.1 |
| 6,252,564 B1 * | 6/2001 | Albert et al. | 345/1.3 |
| 6,297,945 B1 * | 10/2001 | Yamamoto | 361/681 |
| 6,304,763 B1 * | 10/2001 | Jahagirdar et al. | 345/169 |
| 6,326,613 B1 * | 12/2001 | Heslin et al. | 250/239 |
| 6,327,482 B1 * | 12/2001 | Miyashita | 345/102 |
| 6,340,957 B1 * | 1/2002 | Adler et al. | 345/1.3 |
| 6,343,006 B1 * | 1/2002 | Moscovitch et al. | 361/681 |
| 6,367,934 B1 * | 4/2002 | Salesky et al. | 353/74 |
| 6,392,786 B1 * | 5/2002 | Albert | 359/296 |
| 6,466,292 B1 * | 10/2002 | Kim | 349/143 |
| 2002/0021258 A1 * | 2/2002 | Koenig | 345/1.1 |
| 2002/0021622 A1 * | 2/2002 | Baroche | 368/10 |
| 2003/0114200 A1 * | 6/2003 | Lee | 455/566 |
| 2004/0165060 A1 * | 8/2004 | McNelley et al. | 348/14.08 |

FOREIGN PATENT DOCUMENTS

| | | |
|---|---|---|
| EP | 0898223 A2 | 2/1999 |
| WO | WO 00/59179 | 10/2000 |
| WO | WO 00/79372 A1 | 12/2000 |
| WO | WO 01/53919 | 7/2001 |

* cited by examiner

*Primary Examiner*—Richard Hjerpe
*Assistant Examiner*—Leonid Shapiro

(57) ABSTRACT

A display apparatus for providing multi-sided viewing functionality to a portable computer system. In one embodiment, the display apparatus is comprised of a front cover which is electrically and mechanically coupled to the portable computer. A first display component is disposed on the front cover and includes a front display panel and a rear display panel. A second display component is coupled to the portable computer system. A display control circuit, coupled to the portable computer system, is adapted to activate and to deactivate display panels in direct response to the orientation of the front cover, and when portable computer system is so configured, to the orientation of a second cover, interposed between the front cover and the portable computer system. Electronic ink technology is used in the formation of the two sided display components.

28 Claims, 19 Drawing Sheets

MULTI-SIDED DISPLAY FOR PORTABLE COMPUTER

FIELD OF THE INVENTION

The present invention relates to an apparatus for providing a multi-sided display for a portable computer system. More particularly, the present invention provides an apparatus for providing multiple electronic-display panel capabilities for a portable computer system.

BACKGROUND OF THE INVENTION

As the continuing advances in technology have enabled the miniaturization of the components required to build computer systems, new categories of computer systems have been created. One of the categories of computer systems has been the portable, hand held, or "palmtop" computer system, referred to as a personal digital assistant or PDA. Other examples of portable computer systems include electronic address books, electronic day planners, electronic schedulers and the like.

A palmtop computer system is a computer that is small enough to be held in the user's hand and as such is "palm-sized." As a result, palmtops are readily carried about in the user's briefcase, purse, and in some instances, in the user's pocket. By virtue of its size, the palmtop computer, being inherently lightweight, is therefore exceptionally portable and convenient.

The continuing miniaturization of computer systems has enabled a user to now carry in their pocket very powerful computer systems. However, miniaturization has also reduced some of the functionality of the portable computer system compared to desktop systems. To support the form factor of the portable computer, smaller graphic display panels and reduced graphic resolution have been developed. By virtue of the reduction of the graphic display capabilities of the portable computer, less information is now visible to the user.

Another drawback to the portable computer system is its display panel. While the development of the liquid crystal display (LCD) has, in part, enabled the further development of the portable computer system, it is not without certain limitations. An LCD is constructed using glass, and as such, is thick, rigid, and relatively heavy for its size. Additionally, liquid crystal displays are usually visible from one position, and as such, the information displayed is often difficult to see. Another drawback is that some LCD's require backlighting for illumination of the display area which is a constant draw on the retained power within a portable computer. Further, for the LCD to hold the images or text on the display area for the user to see, a constant flow of power must be applied to the screen, which is a draw on the retained power within a portable computer.

With most portable computer systems operating on battery power, the continuous drain of power, as described, significantly reduces the usable time before recharging is required. Additionally, because increased quantities of battery power are required for the portable computer to operate longer without being recharged/replaced, power consumption directly impacts the size of the battery required.

Another computer system being developed and currently available is the electronic book computer, commonly referred to as an "e-book." An e-book has the approximate physical properties associated with a laptop computer, but consists of two viewable areas, each facing the other, analogous to an open book. The e-book is utilized the same as when someone reads a book, but without pages to turn. Instead of turning the page, the two facing screens are refreshed, loading the new text to be read, in a fashion to simulate the turning of a book page. The text is not the printed text that is known in the printed form, but rather groups of pixels that are controlled electronically through the application of voltage or current to create the image of letters, and therefore words. Unfortunately, the e-book, while presenting text in a new manner is as large as a laptop computer, and therefore just as cumbersome.

SUMMARY OF THE INVENTION

Thus a need exists for a portable computer system with additional display panels. Another need exists for an apparatus that fills the above need and which provides multi-sided e.g., two-sided display into the front cover of a portable computer system. Another need exists for an apparatus that fills the above need and which further provides an additional display panel on a palmtop computer. Another need exists for an apparatus that fills the above need and which further provides a switching mechanism to control which of the display panels are activated by, e.g., a mechanism that responds to the position of the front cover of the portable computer.

These and other objects and advantages of the present invention will no doubt become obvious to those of ordinary skill in the art after having read the following detailed description of the preferred embodiments which are illustrated in the various drawing figures.

Accordingly, the present invention provides an apparatus for providing multi-sided viewing functionality to a portable computer system. The present invention further provides, in one embodiment, an apparatus that achieves the above listed feature which further provides two-sided display capabilities to the front cover of the portable computer system. Furthermore, the present invention also provides an apparatus that provides the above listed features and which further provides an additional display panel to the portable computer system. Additionally, the present invention also provides an apparatus that provides the above listed features and which readily and transparently controls the activation of the display panels by the opening of the front cover of the portable computer system.

In one embodiment, the present invention is comprised of a front cover. The front cover is electrically and mechanically coupled to the palmtop computer. In the present embodiment, a first display component is coupled to the front cover. The first display component is further comprising a front display panel and a rear display panel. In the present embodiment, a second display component is coupled to the portable computer system. In the present embodiment, a third display component may be present and coupled to the portable computer system. Additionally, in the present embodiment, the technology used in the display component is electronic ink display. Further, in the present embodiment, the display component is flexible. Furthermore, in the present invention, a display control circuit is coupled to the portable computer system. The display control circuit is adapted to activate the first display component and the second display component. The display control circuit is further adapted to provide that activation in direct response to the orientation of the front cover.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
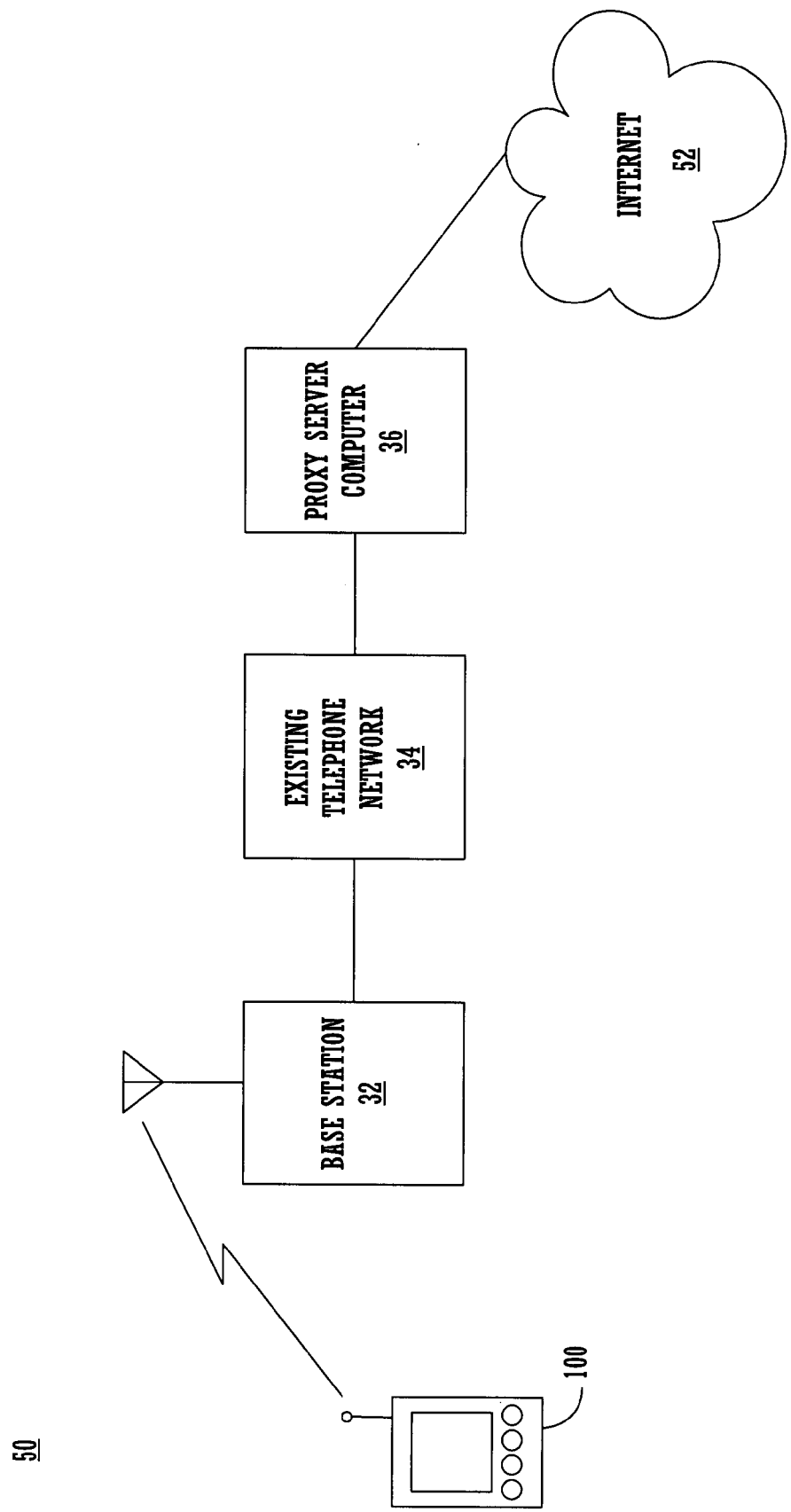
FIG. 1A is a block diagram of an exemplary network environment including a portable computer system in accordance with one embodiment of the present invention.

An display apparatus having multi-sided display functionality for a portable computer system is described. In one embodiment, a flat panel technology is employed. In the following description, for purposes of explanation, numerous specific details are set forth in order to provide a thorough understanding of the present invention. It will be obvious, however, to one skilled in the art that the present invention may be practiced without these specific details. In some instances, well-known structures and devices are shown in block diagram form in order to avoid obscuring the present invention. In other instances, well-known methods, procedures, component, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "activating" or "determining" or "indicating" or "indexing" or "receiving" or "performing" or "initiating" or "sending" or "implementing" or "disabling" or "enabling" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are discussed primarily in the context of a portable computer system, such as a palmtop or personal digital assistant. However, it is appreciated that the present invention can be used with other types of devices that utilize a flat panel display device, including but not limited to palmtop computer systems, pagers, cell phones, remote web browsers, remote control devices, etc.

Exemplary Palmtop Platform

FIG. 1A is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices which may have the ability to wirelessly communicate with a network. As such, for purposes of the present application, the terms "portable computer" and "mobile device" will be considered synonymous and will be used interchangeably.

Base station 32 can be both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. Additionally, in FIG. 1A, the existing telephone network could also be a packet-based network, as is the Bellsouth wireless data network utilized by some conventional portable computer systems. However, a wireless communication interface is utilized to communicate data and information between portable computer system 100 and base station 32. It should be appreciated that one embodiment of a wireless communication system in accordance with the present invention is the Mobitex wireless communication system. Furthermore, any wireless network, in addition to the Mobitex wireless network, can support the functionality to be disclosed herein.

Figure 1B:
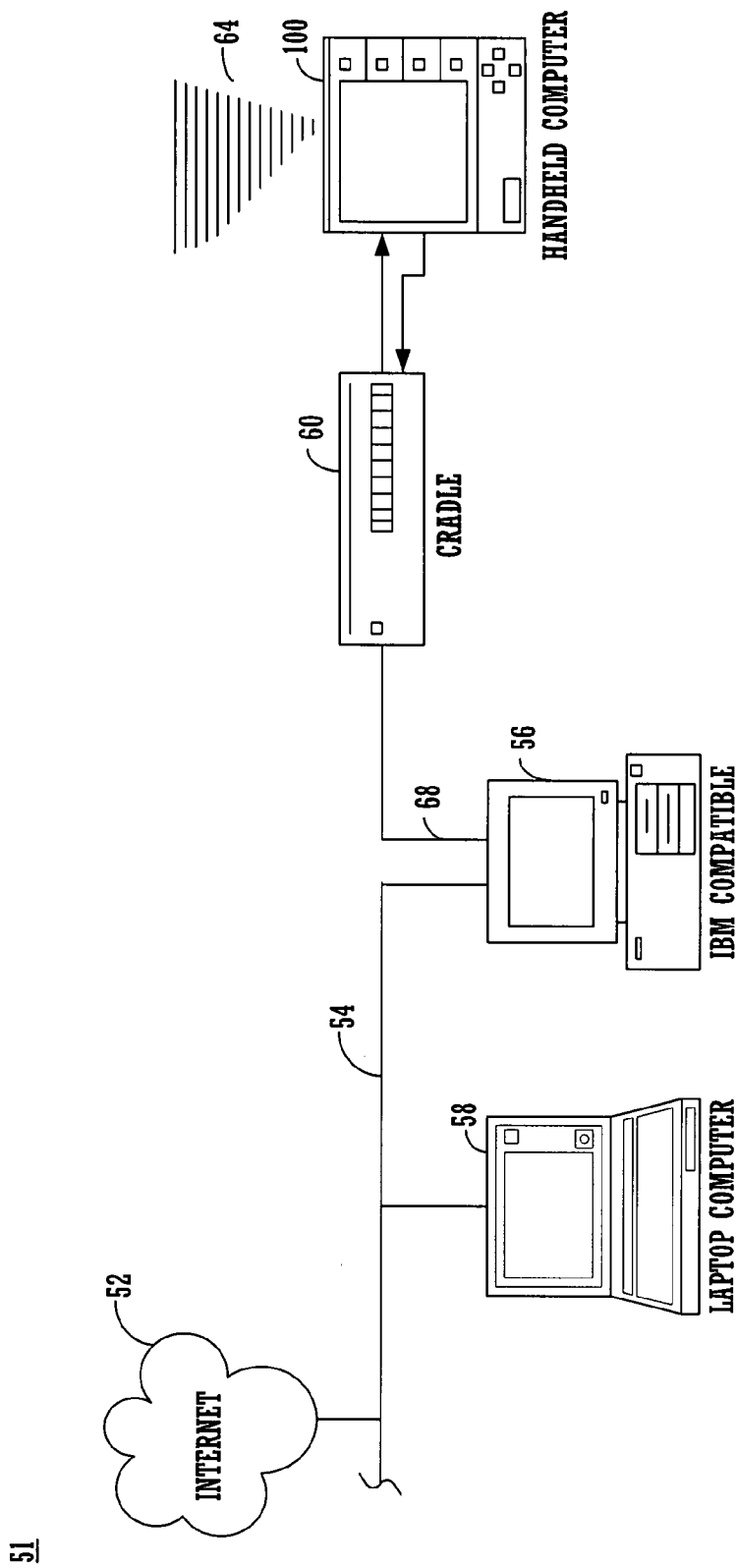
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51.

Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100. Cradle 60 provides an electrical and mechanical communication interface between bus 54 (and anything coupled to bus 54) and the computer system 100 for two-way communications. Portable computer system 100 may instead be coupled to host computer systems 56 and 58 via a wireless (radio) connection. Computer system 100 also contains a wireless infrared communication mechanism 64 for sending and receiving information from other devices. Additionally, in FIG. 1B, the existing telephone network could also be a packet-based network, as is the Bellsouth wireless data network utilized by some conventional portable computer systems.

With reference to both FIGS. 1A and 1B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
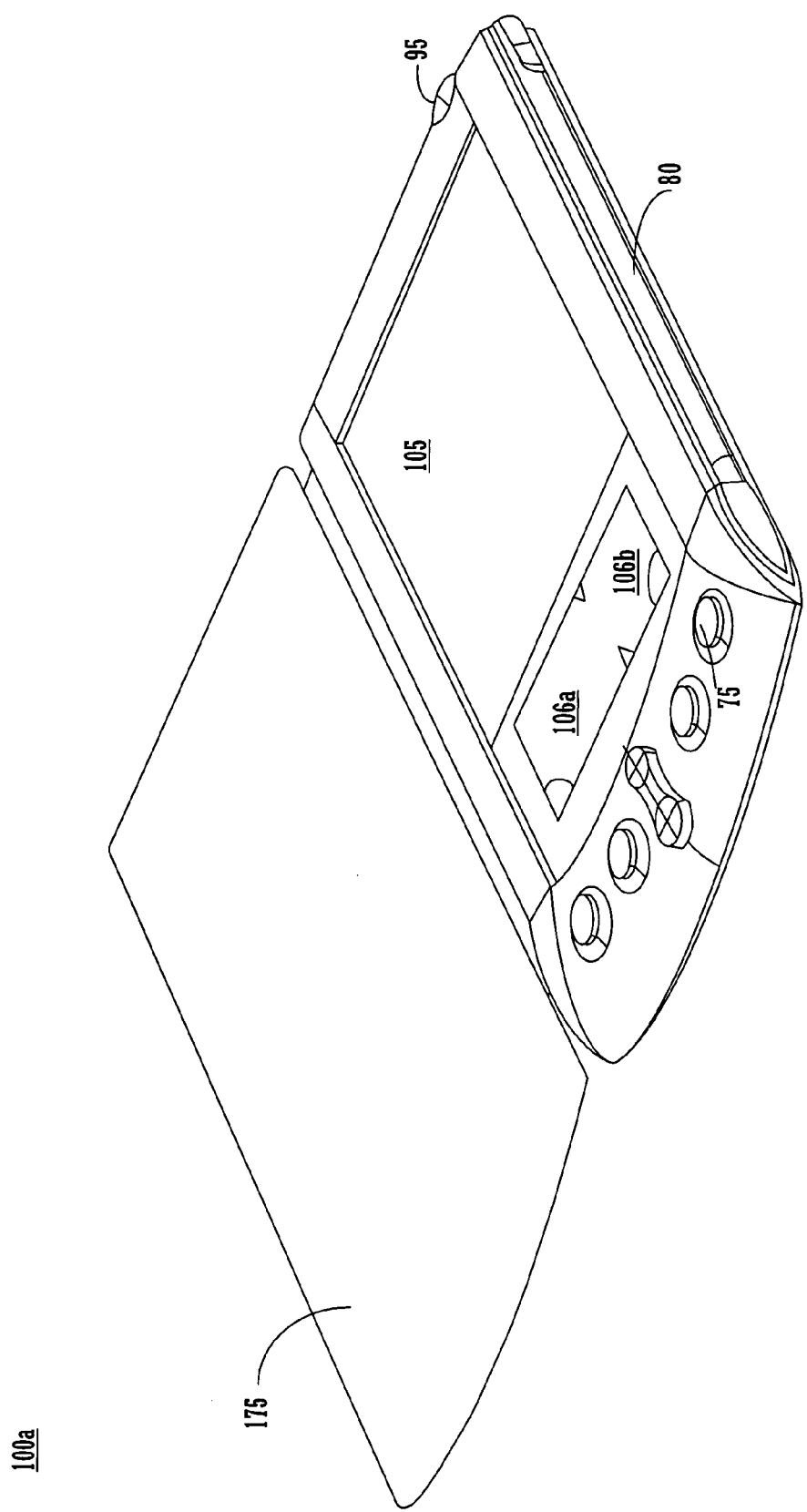
FIG. 2 is a top side perspective view of a portable computer system in accordance with one embodiment of the present invention.

FIG. 2 is a perspective illustration of the top face 100a of one embodiment of the palmtop computer system 100 of the present invention. The top face 100a contains a flat panel display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown. Also shown is front cover 175. As described further below, front cover 175 includes a display component having a rear display panel and a front display panel.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
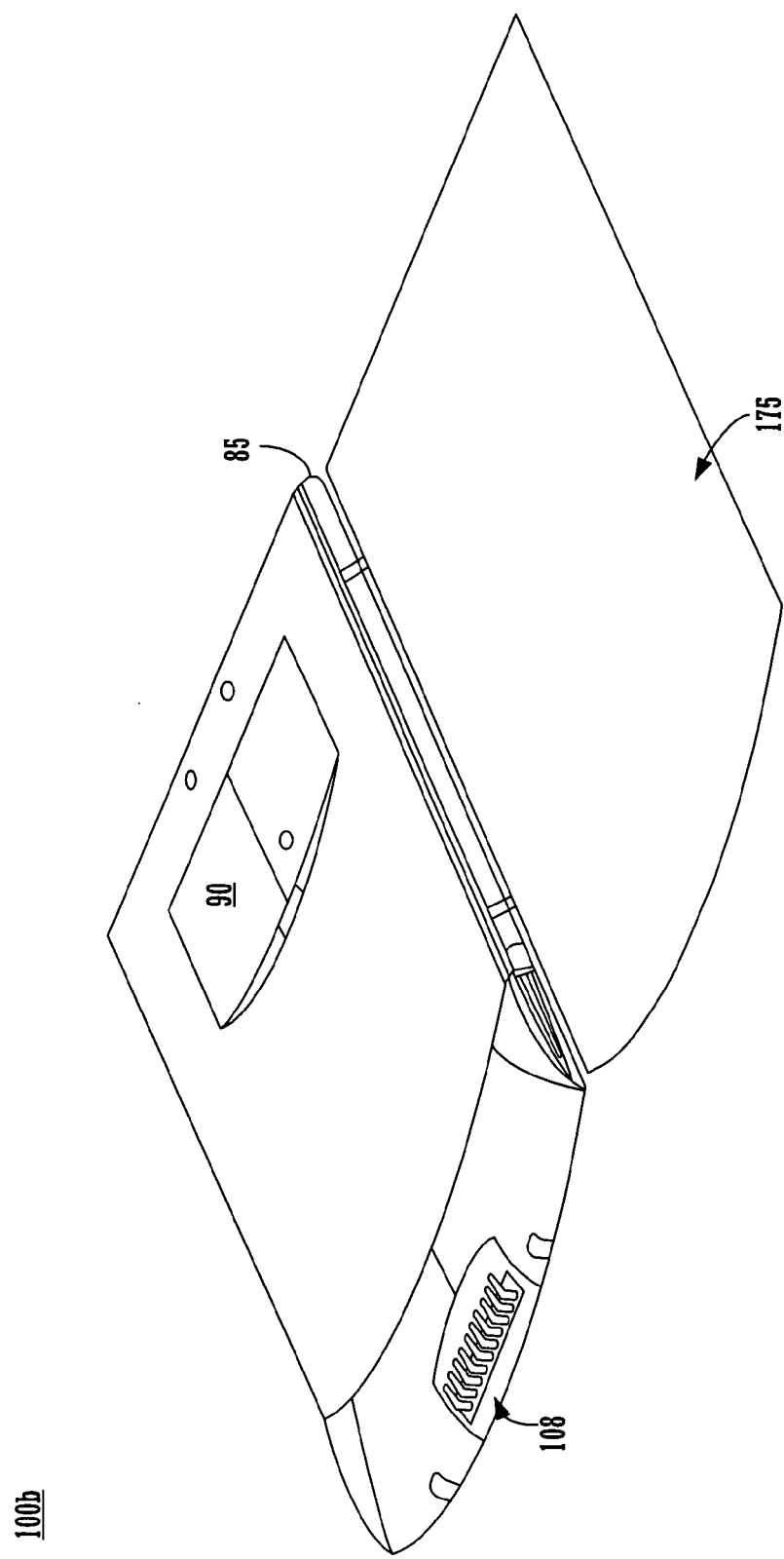
FIG. 3 is a bottom side perspective view of the portable computer system of FIG. 2.

FIG. 3 illustrates the bottom side 100b of one embodiment of the palmtop computer system that can be used in accordance with various embodiments of the present invention. An extendible antenna 85 is shown, and also a battery storage compartment door 90 is shown. A communication interface 180 is also shown. Also shown is front cover 175. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 4:
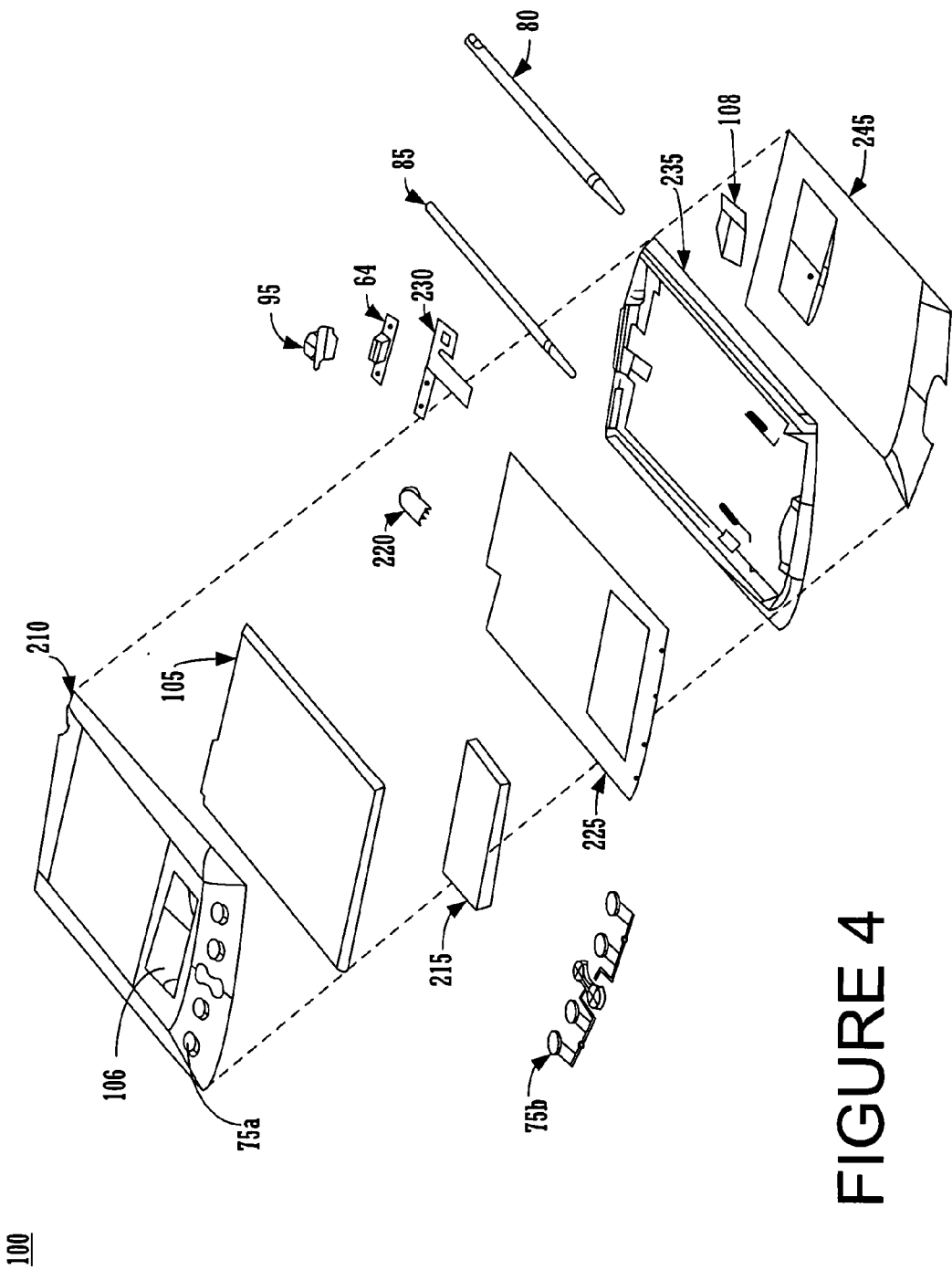
FIG. 4 is an exploded view of the components of the portable computer system of FIG. 2.

FIG. 4 is an exploded view of the palmtop computer system 100 in accordance with one implementation. It should be noted that front cover 175, as depicted in FIGS. 2 and 3, is not shown so as to simplify the description of the exploded view of portable computer 100. Computer system 100 contains a back cover 245, and a front cover 210 having an outline of region 106 and holes 75a for receiving buttons 75b. Flat panel display 105 is disposed on front cover 210. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Figure 5:
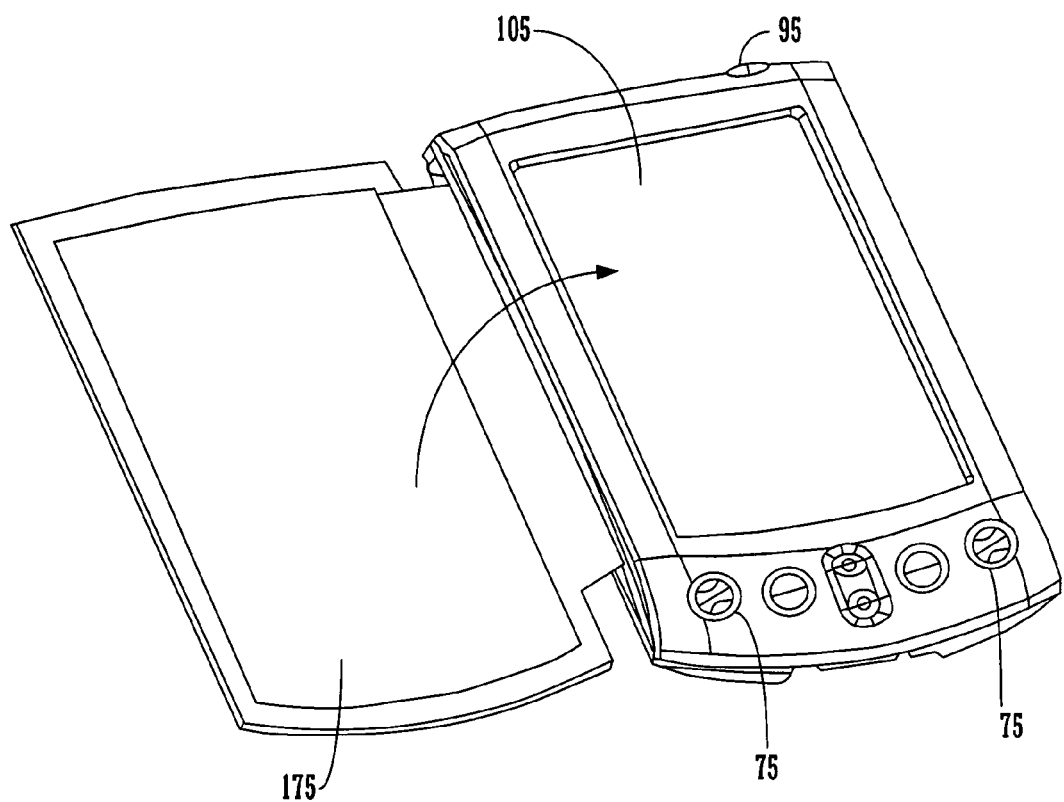
FIG. 5 is a top side perspective view of a portable computer system configured a front cover in accordance with one embodiment of the present invention.

FIG. 5 is a front angled perspective illustration of a portable computer system with an opened front cover. Portable computer system 100 is shown as equipped with front cover 175 removably coupled to portable computer 100, which is adapted to provide protection against damage to display panel 105. Cover 175 may rotate as shown by the arrow, about the axis, or hinge. Portable computer 100 as depicted in FIG. 5 is analogous to the palmtop computer of FIGS. 2, 3, and 4 including dedicated and/or programmable buttons 75 and on/off button 95.

Figure 6:
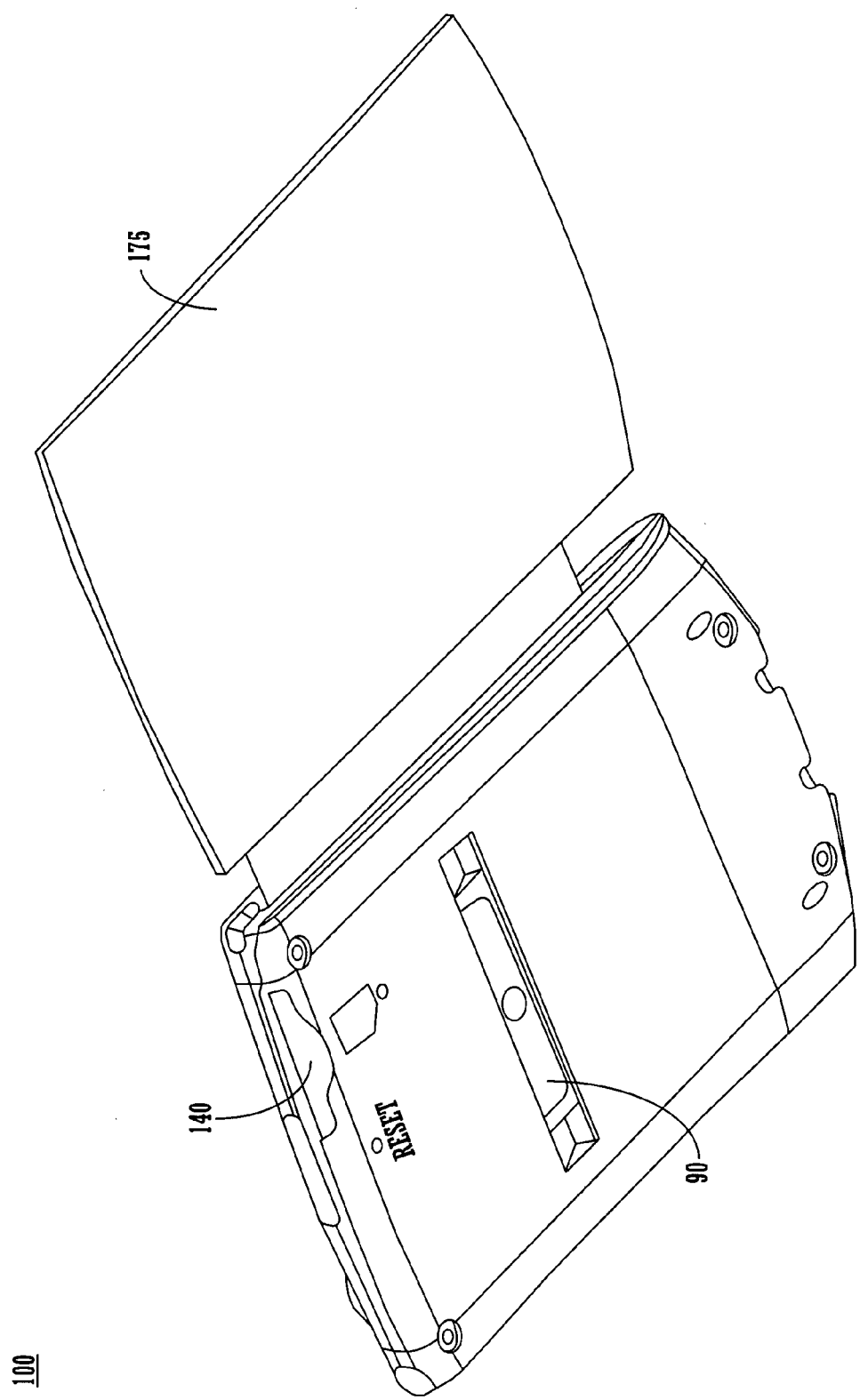
FIG. 6 is a bottom side perspective view of the palmtop computer system of FIG. 5.

FIG. 6 is a rear angled perspective illustration of the back face and the back of front cover 175 of portable computer system 100 of FIG. 5. Portable computer system 100 is shown as having optional data storage device receptacle 140, adapted to receive optional data storage devices, e.g., memory sticks, secure data cards, and the like. Portable computer 100 of FIG. 6 is otherwise analogous to portable computer 100 of FIG. 5.

Figure 7:
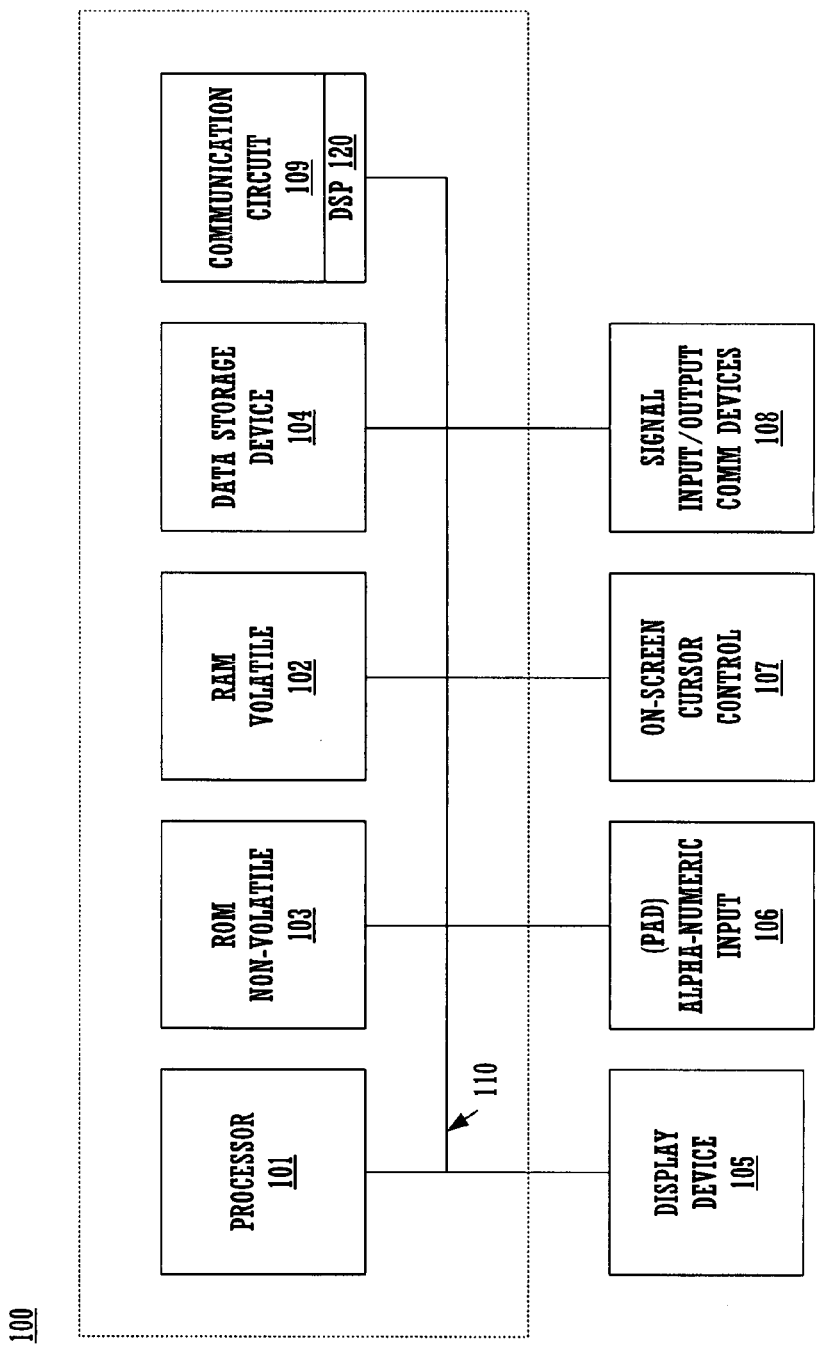
FIG. 7 is a block diagram of one embodiment of a portable computer system, in accordance with the present invention.

FIG. 7 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 7, computer system 100 also includes a signal transmitter/receiver device 108, which is coupled to bus 110 for providing a physical communication link between computer system 100, and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 7 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. Display device 105 is suitable for generating graphic images and alphanumeric characters recognizable to the user. In the preferred embodiment, display device 105 is a flat panel display.

Multi-Display Embodiment

Figure 8:
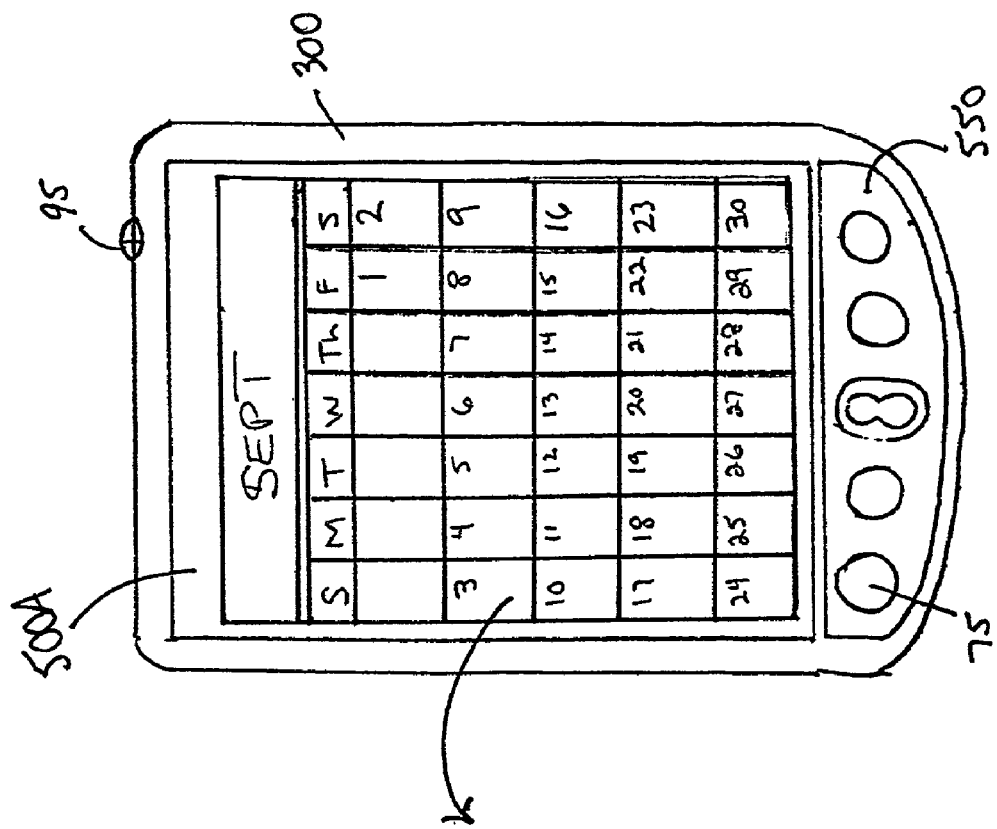
FIG. 8 is a front facing illustrated perspective view of a portable computer system configured with a display component disposed on the front cover, in accordance with one embodiment of the present invention.

With reference to FIG. 8, portable computer system 100 is shown in a front facing illustrated perspective view with the front cover closed. This embodiment provides a display component as the cover and this display component has a front display panel and a rear display panel. In this embodiment, flat panel display technology is used. On/off button 95 is shown as being disposed on the top surface area of portable computer 100 and oriented on the right side. Region 550, shown as disposed toward the bottom of front cover 300, is adapted to provide access to dedicated and/or programmable buttons 75. In one embodiment of the present invention, when front display panel 500A is activated through the pressing of on/off button 95, the information displayed may need to be manipulated, and therefore access to buttons 75 is most advantageous. Front display panel 500A is shown as disposed integral with hinged front cover 300. Front cover 300 may rotate, as shown by the arrow, about the axis. A display control circuit 200 (FIG. 13) is included in portable computer 100 integral with the electronic circuitry within the portable computer, and is adapted to control the activation of the display panels, as described in more detail herein.

Referring to FIG. 8, when a user turns on/powers up palmtop computer 100, display control circuit 200 determines the orientation of front cover 300. If display control circuit 200 (FIG. 13) determines that front cover 300 is in the closed (default) position, it activates front display panel 500A such that information or data becomes viewable. In the example shown, the data viewed is a monthly calendar, e.g., the month of September, as shown in FIG. 8. It should be appreciated that the data could be any data, e.g., a GUI (graphical user interface) or other information presented in a fashion associated with single panel displays.

Figure 9:
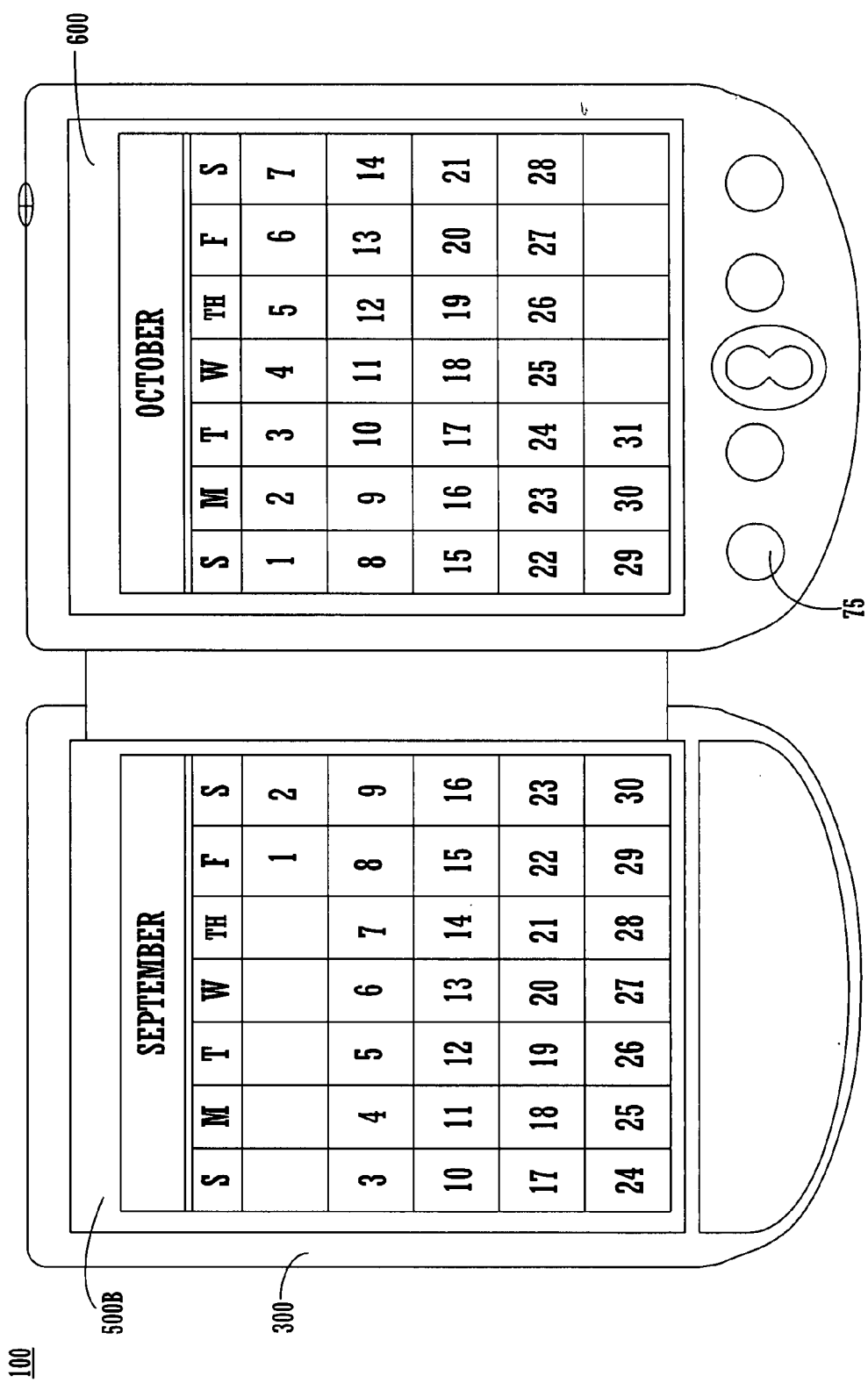
FIG. 9 is a front facing illustrated perspective view of the portable computer system of FIG. 8 with the front cover in the open position, in accordance with one embodiment of the present invention.

Referring now to FIG. 9, the portable computer 100 of FIG. 8 is shown as having front cover 300 in the open (non-default) position. Rear display panel 500B, on the left, is now visible. Rear panel display 500B is the other display panel contained within front cover 300, and is functionally analogous to front display panel 500A. Display screen 600 is shown on the right, coupled to palmtop computer 100, and is also functionally analogous to either display panel 500A or 500B.

Still referring to FIG. 9, by virtue of the orientation of front cover 300, display control circuit 200 automatically deactivates originally activated front display panel 500A, and activates rear panel 500B of front cover 300. Additionally, display control circuitry 200 activates now visible display screen 600. When front cover 500A is deactivated, the data or information previously viewable, e.g., the month of September as shown in FIG. 8, is reoriented so as to be identically viewable on rear display panel 500B, as shown in FIG. 9. Additionally, display screen 600 is activated thereby providing another viewable panel on which new data or information may be displayed. In the current example, the information is a monthly calendar, e.g., the month of October, and it shown on the right of FIG. 9. Of course, the user may display any information on either of the multiple display panels.

It should be appreciated that by providing a second display panel to the functionality of a portable computer system, the amount of viewable surface area has been effectively doubled, therefore providing increased functionality to the portable computer system. For example, a user may display a calendar on one panel, and notes regarding the calendar on the other. In another example, a user may display a schedule on one panel and information regarding the calendar on the other. In yet another example, a user may display the GUI (graphical user interface) on one panel, and have the selected icon's associated application appear on the other screen, reducing the time required to switch back and forth from the GUI to associated applications as is customary when using a conventional portable computer system. In fact, a two-sided display, as one embodiment of the present invention, provides an almost endless array of functional configurations.

Figure 10:
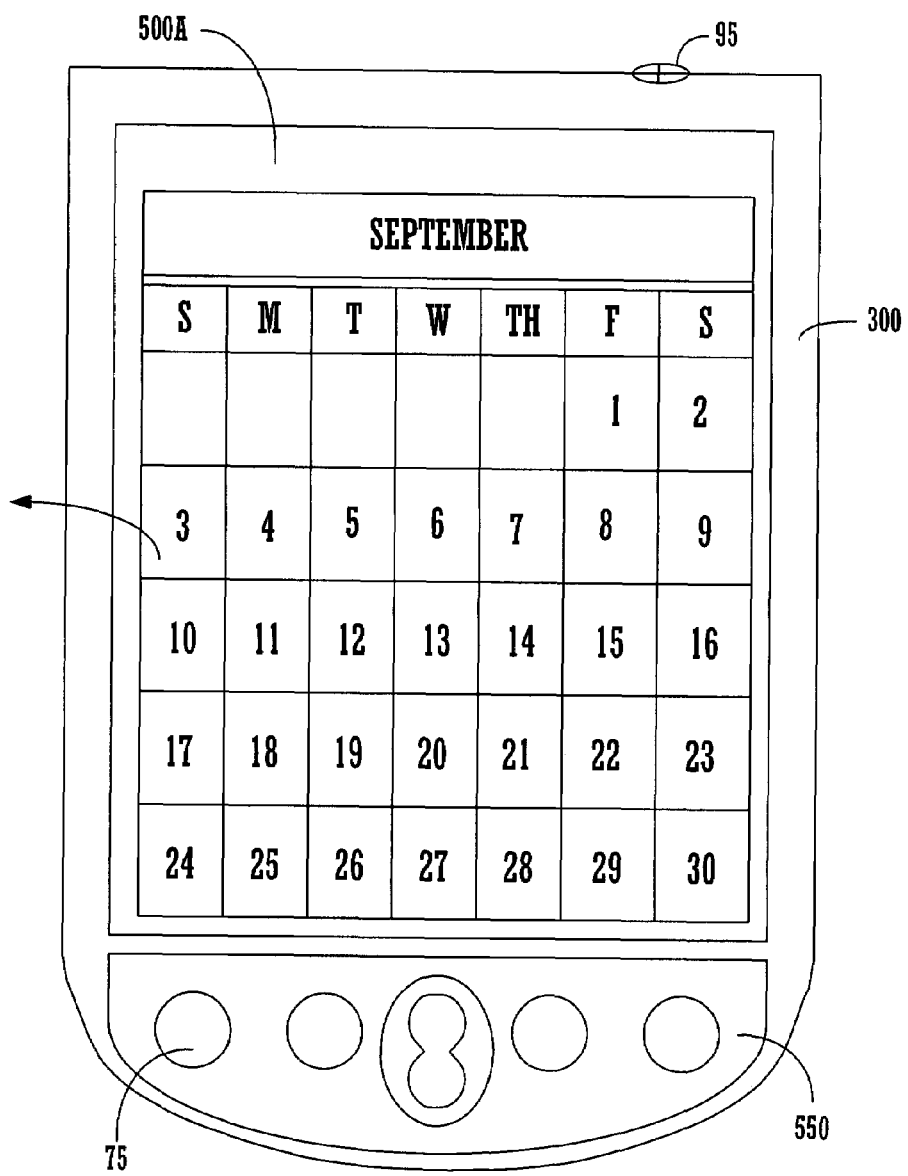
FIG. 10 is a front facing illustrated perspective view of a portable computer system configured with three display components, in accordance with one embodiment of the present invention.
Figure 11:
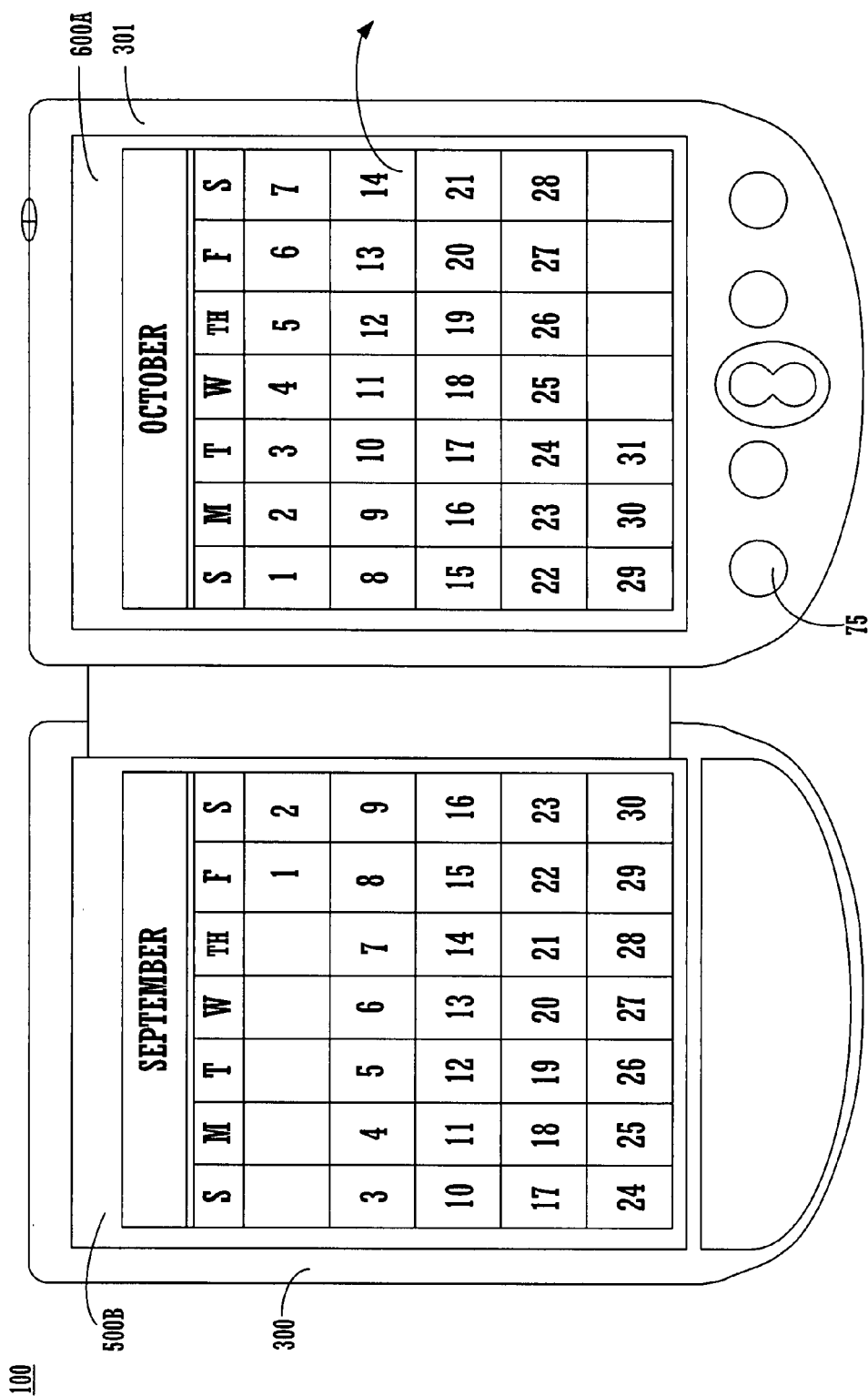
FIG. 11 is a front facing illustrated perspective view of the portable computer system of FIG. 10 with the front cover opened, exposing the second of three display components, in accordance with one embodiment of the present invention.
Figure 12:
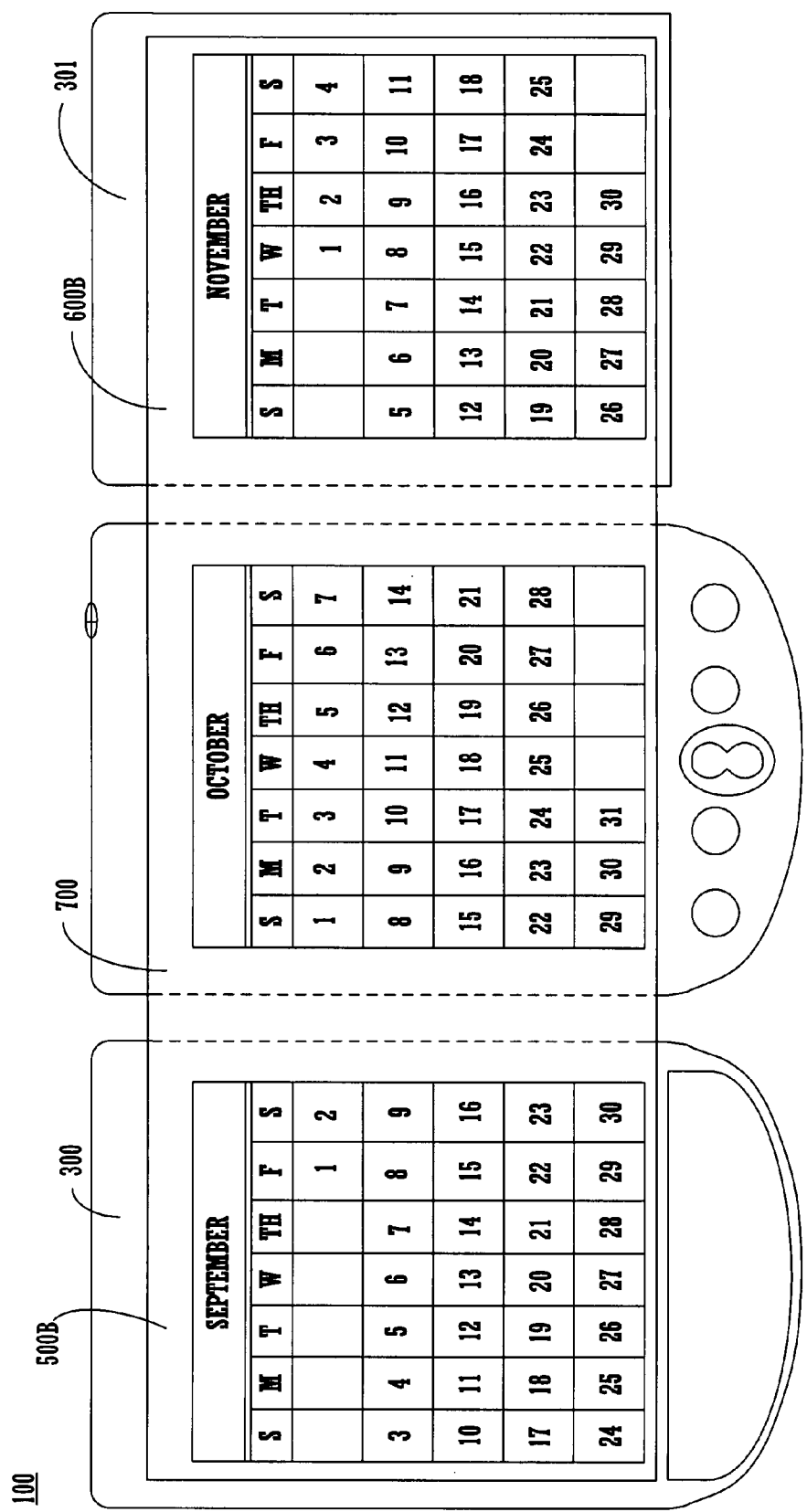
FIG. 12 is a front facing illustrated perspective view of the portable computer system of FIG. 10 with the front and second covers opened, exposing three display panels, in accordance with one embodiment of the present invention.

FIGS. 10, 11, and 12 are front facing illustrated perspective views of portable computer 100 configured with three display panels, in accordance with another embodiment of the present invention. With reference to FIG. 10, portable computer system 100 has two flip covers and is shown in a front facing illustrated perspective view, one embodiment of the present invention. The example of FIG. 10 illustrates front cover 300 closed. Front cover 300 is a display component having a front display panel and a rear display panel. Region 550, shown as disposed toward the bottom of front cover 300, is adapted to provide access to dedicated and/or programmable buttons 75. Front display panel 500A is shown as disposed integral with hinged front cover 300. Front cover 300 may rotate, as shown by the arrow, about the axis. Like FIG. 8, display control circuit 200, (FIG. 13), is included within palmtop computer 100 integral with the electronic circuitry within the palmtop computer, and is adapted to control the activation of the display panels.

Referring to FIG. 10, when a user turns on/powers up palmtop computer 100, display control circuit 200 determines the orientation of front cover 300. If display control circuit 200 determines that front cover 300 is in the closed (default) position, it activates front display panel 500A such that information or data becomes viewable. In one example, the data viewed is a monthly calendar, e.g., the month of September, as shown in FIG. 10. It should be appreciated that the data viewed, in another example, could be a GUI (graphical user interface) or other information presented in a fashion associated with a single panel display.

Referring now to FIG. 11, the portable computer 100 of FIG. 8 is shown as having front cover 300 in the open (non-default) position. Rear display panel 500B, on the left, is now visible. Also now visible is second cover 301, on the right, and is adapted to rotate, as shown by the arrow, about the axis. Incorporated into second cover 301 is a two-sided display component analogous to the two-sided display component disposed within front cover 300. Front cover 301 also contains a front display panel and a rear display panel. Rear panel display 500B, the other display panel contained within front cover 300, is functionally analogous to front panel display 500A. Front display panel 600A, on the right, is disposed on the now visible second cover 301. Front display panel 600A is also functionally analogous to front display panel 500A.

Referring to FIG. 11, by virtue of the orientation of front cover 300, display control circuit 200 automatically deactivates originally activated front display panel 500A, and activates rear panel 500B of front cover 300. Additionally, display control circuitry 200 automatically activates now visible front display panel 600A of second cover 301. When front panel display 500A of front cover 300 is deactivated, the data or information previously viewable, e.g., the month of September as shown in FIG. 10, is reoriented so as to be identically viewable on rear display panel 500B, as shown in FIG. 11. Additionally, front display panel 600A is activated thereby providing another new viewable panel on which data or information may be displayed. In the current example, the information is a monthly calendar, e.g., the month of October, and is shown as viewable on rear display panel 600B of FIG. 11.

Now referring to FIG. 12, the portable computer system 100 of FIGS. 10 and 11 is now shown with three display panels visible. Front cover 300 is shown in the open position, which therefore has activated visible display panel 500B. Second cover 301 is also shown as being in the open (non-default) position. By opening second cover 301, the previously visible front display panel 600A is deactivated, and the now visible display panel 600B is activated by display control circuit 200. Further activated by display control circuit 200 is display screen 700, which can be mounted in palmtop computer 100, and functionally analogous to display screen 600 in FIG. 9.

Referring to FIG. 12, when rear display panel 600B and display screen 700 are activated, the information or data viewable in the deactivated front display panel 600A of FIG. 11 is reoriented so as to be identically viewable on a visible display panel. For instance, the information contained in front display panel 600A was a monthly calendar, e.g., the month of October, as shown in FIG. 11. Instructions provided enable display control circuit 200 to reorient October to be viewable in display screen 700. Additionally, rear display panel 600B is activated thereby providing another viewable panel on which data or information may be displayed. In the current example, the information is a monthly calendar, e.g., the month of November, and is shown as viewable on rear display panel 600B of FIG. 12.

It should be appreciated that in another example of the present invention, the data or information being displayed, as previously described, may or may not require the exemplary configuration as shown in FIGS. 8 and 9, or in FIGS. 10, 11, and 12. It should be further appreciated that configuration of the data or information displayed is generally defined by the user or by the application with which the user is interacting.

It should be appreciated that while the portable computer 100 of FIGS. 8 and 9 is shown as having two distinct display panels, it can be configured analogous to the depicted portable computer 100 of FIGS. 10, 11, and 12, which is shown to have three panels seamlessly connected. This is enabled by the virtue of the thinness, strength, and flexibility of the material used to construct the two-sided display. It should be conversely appreciated that while the palmtop computer 100 of FIGS. 10, 11, and 12 is shown as a seamless panel, it can be adapted to have three distinct display panels.

Including three display panels in palmtop computer 100 enables a user to now see much more information, e.g., a user can view complete spreadsheets without having to switch back and forth from one section to another. In one example, a user would be able to view a graphic e.g., elongated pictures, wide diagrams, complex and expansive formulas, and the like, in their entirety, no longer having to scroll or switch from one section or screen to another. In another example, a user may wish to have multiple daily schedules, or multiple weekly, monthly, or yearly calendars displayed, thereby reducing the switching of screens normally associated with portable computers not configured with the present invention. In yet another example, a user may wish to view multiple financial documents, e.g., annual income statements from various years. In yet another example, a user may wish to view multiple web pages. In still another example, and by utilizing the networking functionalities contained within the portable computer, a user connected and communicating with other individuals via a network, could have information from other portable computers displayed on one or more panels and compared with or integrated into information contained within the other panels. A virtually endless array of viewing configurations and functionalities are now available to a user.

Figure 13:
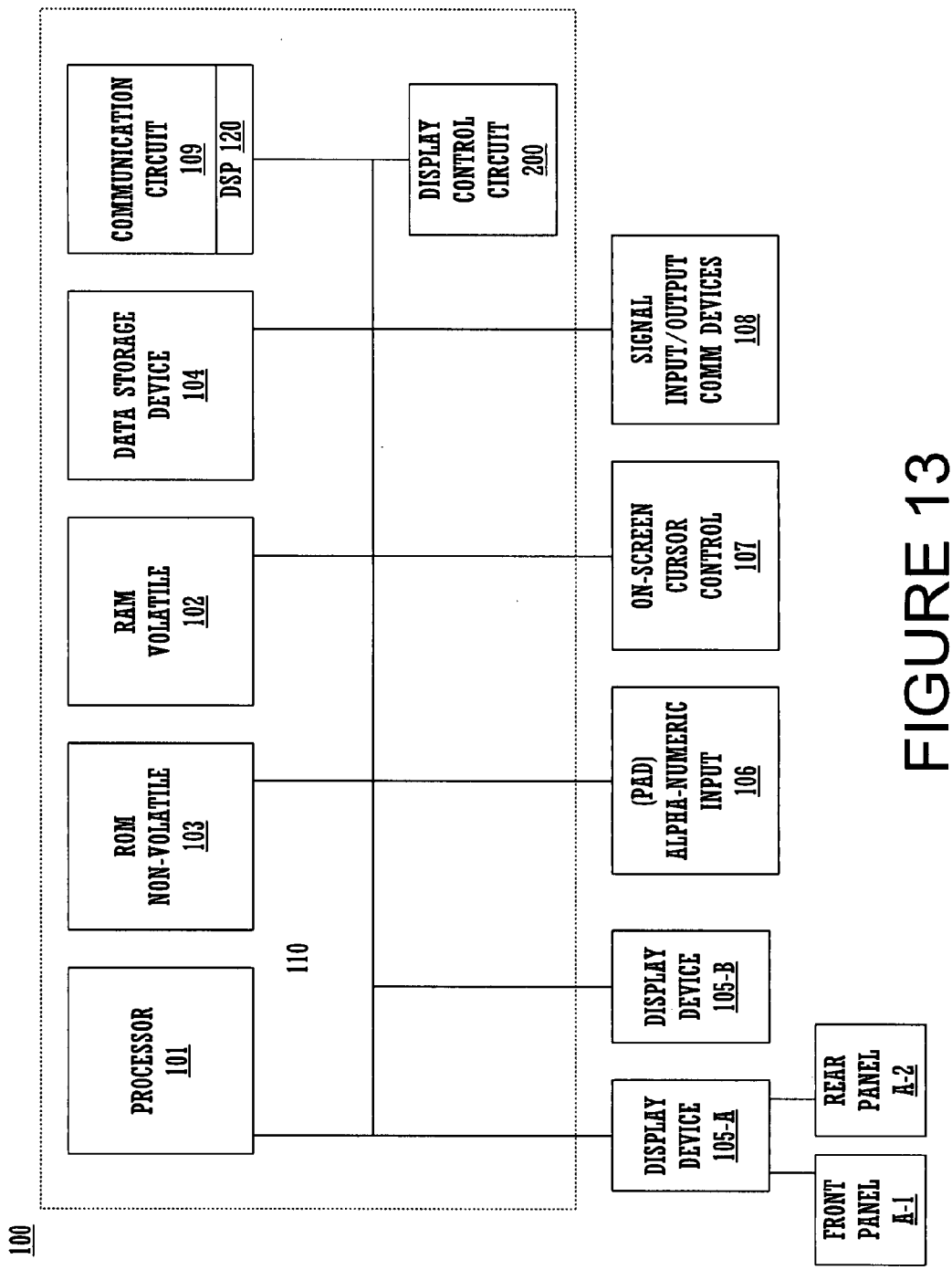
FIG. 13 is a block diagram of the palmtop computer in FIGS. 8 and 9, in accordance with one embodiment of the present invention.

FIG. 13 is a block diagram of the circuitry of the palmtop computer 100 in FIGS. 8 and 9, in one embodiment of the present invention. The circuitry depicted is analogous to the described circuitry of FIG. 7, with the following additions. Display control circuit 200 is added for activating the appropriate display panel, as previously described, is shown as coupled to bus 110. Display component 105-A, with coupled front display panel A-1 and rear display panel A-2, shown as coupled to bus 110 in this embodiment of the present invention, is representative of display panel 500A and display panel 500B disposed upon front cover 300. Display component 105-B, shown as coupled to bus 110, is representative of the display component 600 coupled to palmtop computer 100, in one embodiment of the present invention.

Referring to FIG. 13, it should be appreciated that, in another embodiment of the present invention, e.g., the palmtop computer 100 of FIGS. 10, 11, and 12, display component 105-B would be shown to include front panel B-1 and rear panel B-2, representing display panel 600A and display panel 600B of the palmtop computer 100 in FIGS. 10, 11, and 12. It should be further appreciated that display component 105-C, a third display component representing the display component coupled to palmtop computer 100 would be present in FIG. 13 and would be shown as coupled to bus 110, with the provision that FIG. 13 was a block diagram representation of the palmtop computer 100 of FIGS. 10, 11, and 12.

Figure 14:
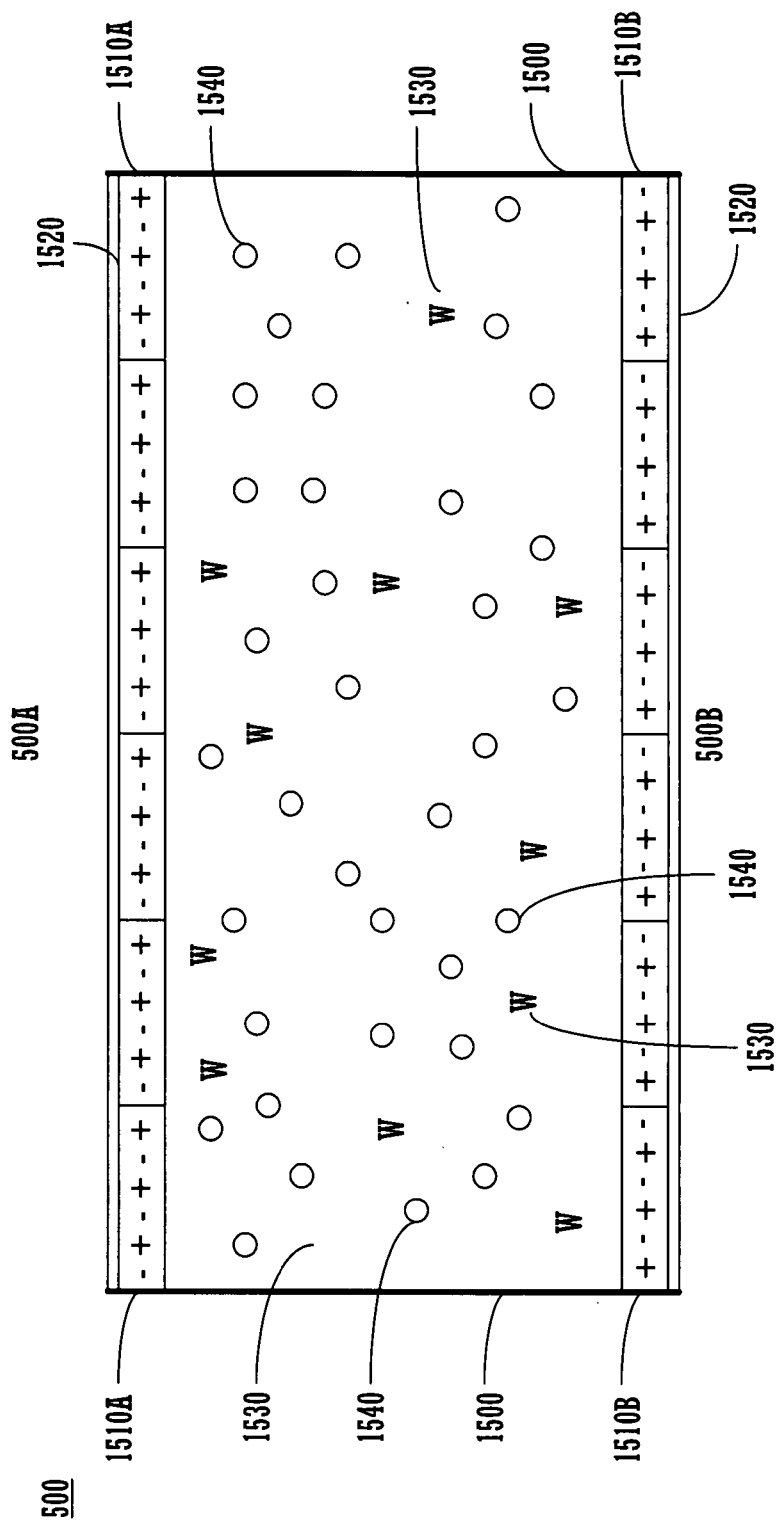
FIG. 14 is a cross section illustrated perspective view of a display panel of the present invention in accordance with one embodiment of the present invention.
Figure 15:
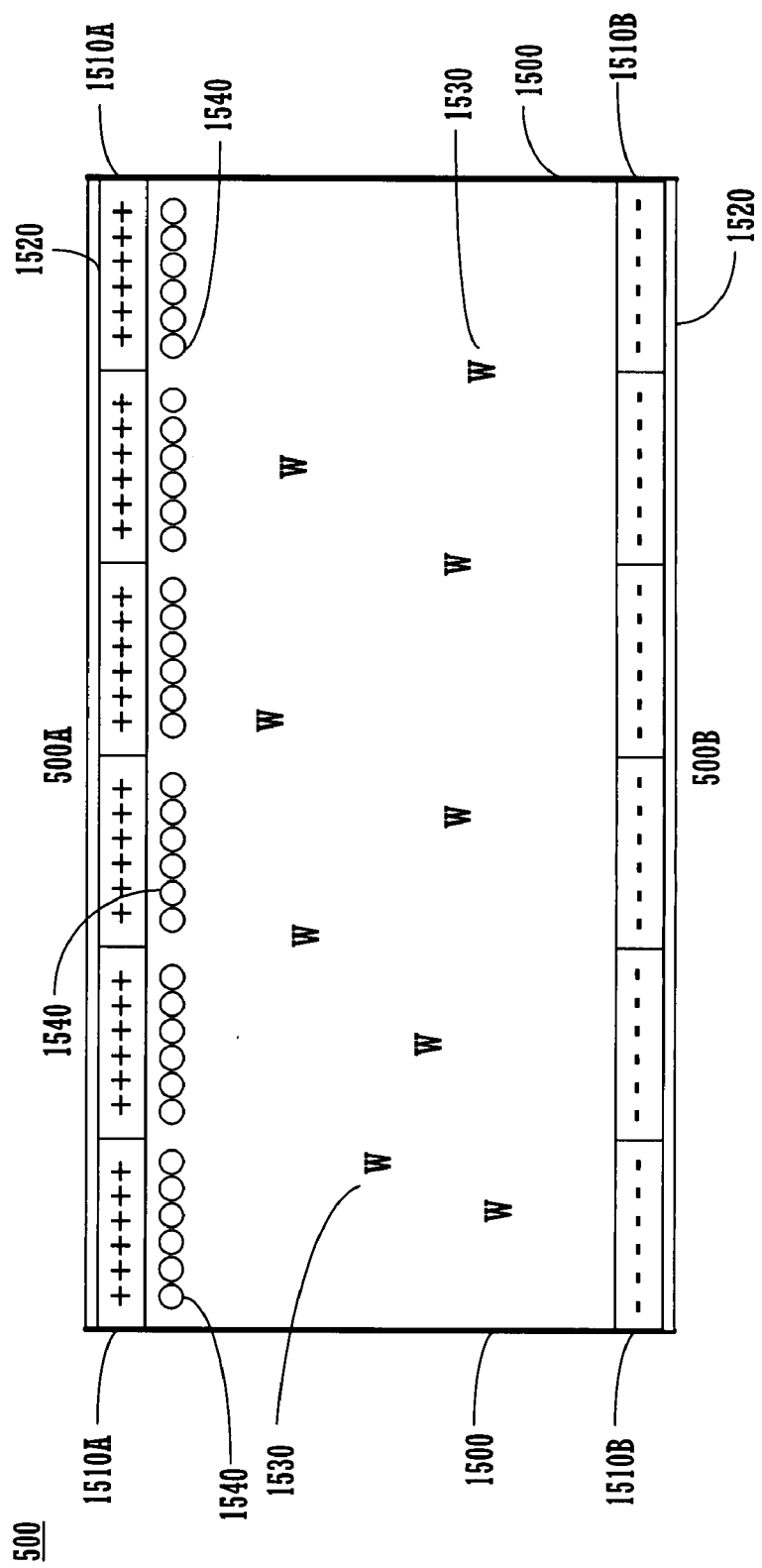
FIG. 15 is a cross section illustrated perspective view of a display panel of the present invention in accordance with one embodiment of the present invention.
Figure 16:
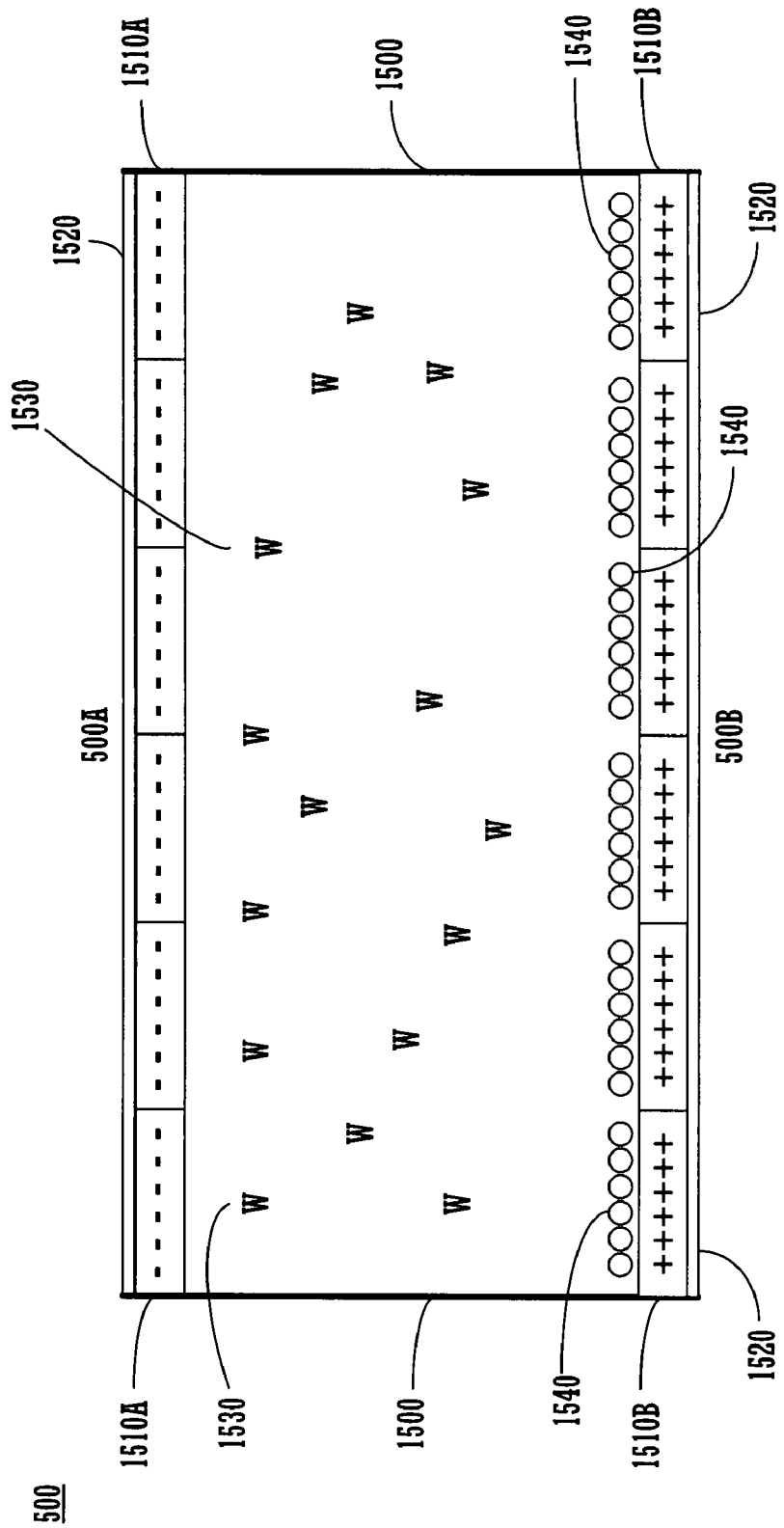
FIG. 16 is a cross section illustrated perspective view of a display panel of the present invention in accordance with one embodiment of the present invention.

In one embodiment, electronic ink technology is used in the formation of the two sided display component discussed above. It should be appreciated that the following drawings in FIGS. 14, 15, and 16 are, while discussed in the context of a two-sided display component 500 having a front display panel 500A and a rear display panel 500B, analogous to the two-sided display panels previously described herein. FIGS. 14, 15, and 16 are cross-section illustrated perspectives of a two-sided display panel with a front display panel and a rear display panel, in one embodiment of the present invention. The cross-section shown is such that that front display panel 500A is oriented facing upward and rear display panel 500B is facing downward.

In FIG. 14, flexible transparent material 1520 is shown as being disposed upon the uppermost surface of component 500 and is also shown as being disposed upon the lowermost surface of component 500. Transparent material 1520 is depicted as having been sealed so as to create a sealed chamber 1500. In one embodiment of the present invention, flexible transparent material 1520 is mylar. Transparent conductor 1510A, oriented below the transparent material 1520 associated with panel 500A is disposed within sealed chamber 1500. Transparent conductor 1510B, oriented above the transparent material 1520 associated with panel 500B is also disposed within sealed chamber 1500. Also disposed within sealed chamber 1500 is ink fluid 1530, which is indicated by a "w." In one embodiment of the present invention, ink fluid 1530 is white in color and comprises the majority of the fluid contained within sealed chamber 1500. Additionally disposed within sealed chamber 1500 are encapsulated ink droplets 1540. Encapsulated ink droplets 1540 are electrostatically charged, making them reactive to a more positive voltage, so as to be drawn to the more positive voltage. In one embodiment of the present invention, encapsulated ink droplets 1540 are black in color.

Referring to FIG. 14, transparent conductor 1510A, associated with display panel 500A, is adapted to conduct voltage such that when a more positive voltage is present, through an activation provided by display control circuit 200, electrostatically charged and encapsulated, in one embodiment, black ink droplets 1540 are drawn to transparent conductor 1510A, thereby displacing ink fluid 1530, and forming into shapes that take the form of graphics or letters. By virtue of the white ink fluid 1530 contrasting with the black ink droplets 1540, a virtual printed paper is displayed through transparent material 1520. It should be appreciated that transparent conductor 1510B, associated with display panel 500B, is analogous in form and function to transparent conductor 1510A, associated with display panel 500A. In one embodiment, transparent conductors 1510A and 1510B are indium tin oxide.

FIG. 14 is a depiction of the display panel in a non powered state, and as such, a more positive voltage is not being applied to either transparent conductor 1510A or 1510B. Therefore, in one embodiment of the present invention, electrostatically charged encapsulated ink droplets 1540 are free floating and are randomly floating about within sealed chamber 1500 and are thusly depicted in FIG. 14.

FIG. 15 is a cross-section illustrated perspective of the display panel when in the default state, analogous to portable computer 100 of FIG. 8, one embodiment of the present invention. When power is applied to portable computer 100 with front cover 300 in the closed or default position, display control circuit 200 automatically activates transparent conductors 1510A, such that it has a more positive voltage. This is shown as positive (+) signs within depicted transparent conductor 1510A and as negative (−) signs within depicted transparent conductor 1510B. Accordingly, this attracts electrostatically charged encapsulated ink droplets 1540 to transparent conductors 1510A associated with display panel 500A. Ink droplets 1540, by virtue of the voltage applied, displace ink fluid 1530, and form letters or graphics viewable from display panel 500A. In one embodiment of the present invention, the ink droplets 1540 take the form of information, e.g., a monthly calendar, e.g., the month of September, as shown in FIG. 8.

FIG. 16 is a cross-section illustrated perspective of the display panel when front cover 300 is in the open position, analogous to portable computer 100 of FIG. 9. When power has been applied to portable computer 100, such that it is turned on, and a user subsequently opens front cover 300, display control circuit 200 deactivates transparent conductor 1510A. Simultaneously, display control circuit 200 activates transparent conductor 1510B, such that it has a more positive voltage. This is shown as positive (+) signs within depicted transparent conductors 1510B and negative (−) signs within transparent conductors 1510A. Accordingly, this attracts electrostatically charged encapsulated ink droplets 1540 to transparent conductors 1510B associated with display panel 500B. Ink droplets 1540, by virtue of the voltage applied, displace ink fluid 1530, and form letters or graphics viewable from display panel 500B. In one embodiment of the present invention, the ink droplets 1540 take the form of a monthly calendar, e.g., the month of September, as shown in FIG. 9.

Referring to FIG. 16, it should be appreciated that subsequent to the opening of front cover 300, the image viewable in display panel 500A, which in one embodiment is a monthly calendar, e.g., the month of September, display control circuit 200 deactivates the viewable image in panel 500A, and activates panel 500B, thereby reorienting the September calendar, such that it is now viewable in panel 500B. This embodiment of the present invention is depicted in FIG. 9. It should be further appreciated that when display control circuit 200 activated display panel 500B, it also activated display screen 600 coupled to portable computer, such that in one embodiment it could be a monthly calendar, e.g., the month of October, also shown in FIG. 9.

It should be appreciated that many of encapsulated ink droplets are contained within the sealed chamber of a two-sided display panel. It should further be appreciated that each two-sided display panel is approximately 1 mm thick, about one seventh the thickness of an LCD. It should also be appreciated that the transparent conductors are configured in numerous grids, such that the text or graphics displayed in a display panel has the appearance of printed paper. It is even further appreciated that the viewable image on the display is visually persistent, meaning that until an additional display panel is activated, in one embodiment of the present invention, or the information/data being displayed is changed, the contents and quality of the display remains constant without using power.

Additionally, it should be appreciated that while the present invention is discussed primarily in the context of having two colors, those colors being black and white, other colors may be used, either as a replacement color for either black or white, but also as an additional color within the sealed chamber. Further, while a more positive voltage applied to transparent conductors attracts the encapsulated ink droplets, colored ink droplets may be responsive to varying amount of voltage conducted through the transparent conductor. In the present embodiment of the present invention, when the transparent conductor associated with one of the display panels has a voltage more positive than that of the opposite side, the encapsulated ink droplets are attracted to the more positive side.

In another embodiment of the present invention, each additional color, as an encapsulated ink droplet, could be electrostatically charged so as to make it responsive to a specific voltage. In one embodiment, red colored ink droplets could be configured to be responsive to 4.35 micro-volts. In one embodiment, green colored ink droplets could be configured to be responsive to 4.30 micro-volts. In one embodiment, blue colored ink droplets could be configured to be responsive to 4.40 micro-volts, and so forth. It should be appreciated that while micro-volts may be utilized to attract the colored ink droplets, other types of electrical energy could also be implemented.

Figure 17:
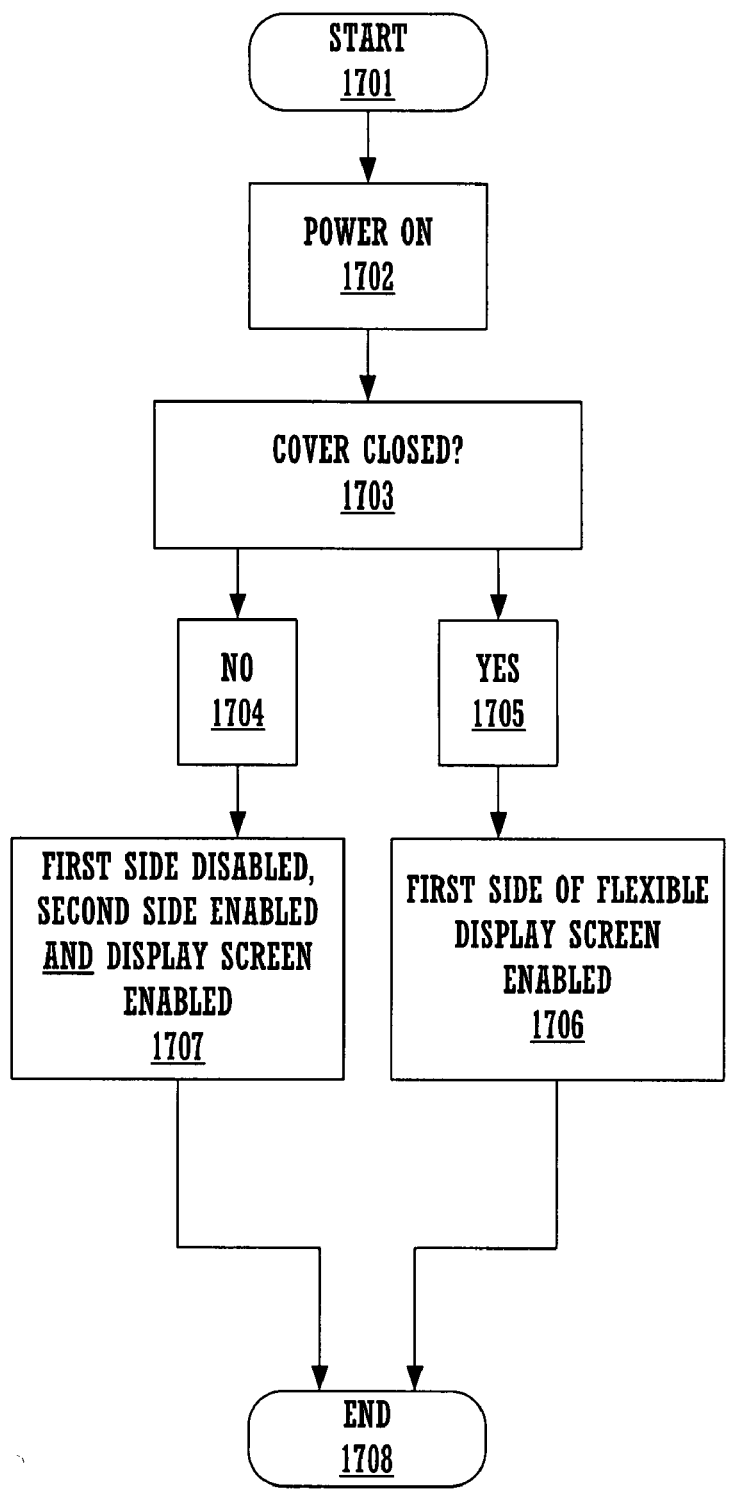
FIG. 17 is flowchart showing the steps in a process 1700 for utilizing the apparatus for providing multi-sided display functionality to the portable computer system in FIGS. 8 and 9, in accordance with one embodiment of the present invention.

With reference to FIG. 17, a flow chart depicting the steps of a process 1700 utilizing the portable computer 100 in FIGS. 8 and 9 is shown, in accordance with one embodiment of the present invention.

In step 1702, a user turns on (powers up) portable computer 100 equipped with two-sided display panels, one embodiment of the present invention. When power is applied, display control circuit 200 is responsive to the position of front cover 300.

In step 1703, if front cover 300 remains in the closed (default) position, as determined by display control circuit 200 in step 1705, display control circuit 200 then, in step 1706, activates display panel 500A, the flexible front panel display disposed in front cover 300, thereby utilizing one display panel to viewably convey information or data to the user, which in one embodiment is a monthly calendar, e.g., the month of September. This current embodiment of the present invention is depicted in FIG. 8.

In step 1703, if front cover 300 is not closed, as determined by display control circuit 200 in step 1704, display control circuit 200 then deactivates display panel 500A, the flexible front display panel of front cover 300, and activates both rear display panel 500B and display screen 600, coupled to palmtop computer 100, thereby utilizing two display panels to viewably convey information or data to the user, as depicted in FIG. 9, one embodiment of the present invention.

In step 1707, it should be appreciated that, in one embodiment of the present invention, when display control circuit 200 deactivates front display panel 500A in preparation to activate rear display panel 500B, the viewable information or data displayed within front display panel 500A, which in the example is a monthly calendar, e.g., the month of September, is reoriented automatically so as to be redisplayed on rear display panel 500B in such a way as to become identically viewable as it was previously on front display panel 500A. Concurrently, display control circuit 200 also activates display screen 600, coupled to palmtop computer 100, enabling a second display panel for the viewing of information or data, which in one example is a monthly calendar, e.g., the month of October. This current example of the present invention is depicted in FIG. 9.

Figure 18:
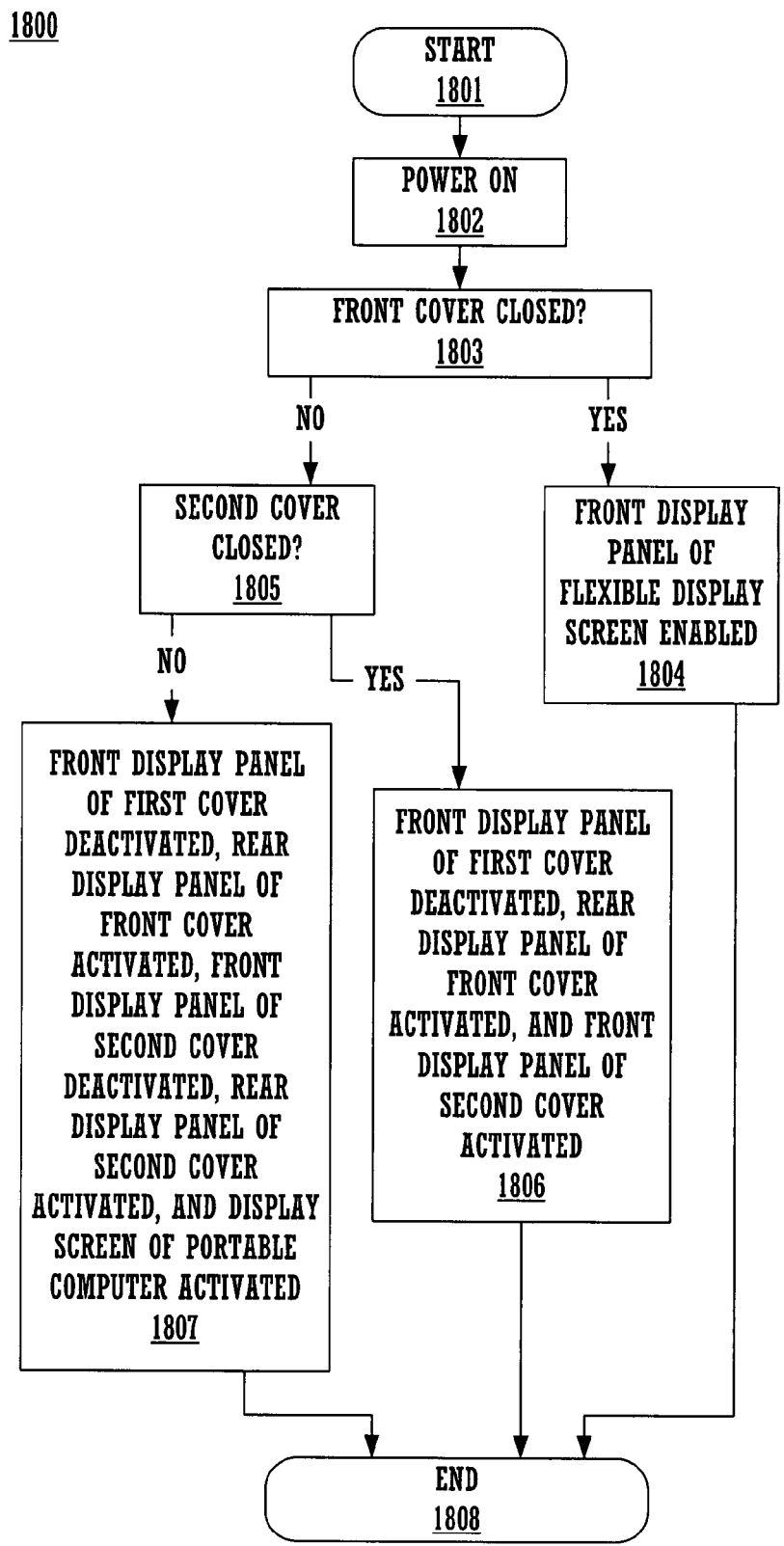
FIG. 18 is flowchart showing the steps in a process 1800 for utilizing the apparatus for providing multi-sided display functionality to the portable computer system in FIGS. 10, 11, and 12, in accordance with one embodiment of the present invention.

With reference to FIG. 18, a flow chart depicting the steps of a process 1800 utilizing the multi-sided display capabilities of the portable computer 100 in FIGS. 10, 11 and 12 is shown, in one embodiment of the present invention.

In step 1802, a user turns on (powers up) portable computer 100 equipped with two-sided display panels, one embodiment of the present invention. When power is applied, display control circuit 200 is responsive to the position of front cover 300.

Regarding step 1803, if front cover 300 remains in the closed (default) position, display control circuit 200 then activates display panel 500A, the flexible front panel display disposed in front cover 300, thereby utilizing one display panel to viewably convey information or data to the user, as represented by step 1804, and depicted in FIG. 10, one embodiment of the present invention.

In Step 1803, if front cover 300 is not in the closed position, display control circuit 200 then further determines whether second cover 301 is in the open position or closed (default) position, as represented by Step 1805.

In Step 1805, if display control circuit 200 determines that second cover 301 is in the closed (default) position, display control circuit 200 deactivates front panel 500A of front cover 300, and activates both flexible rear display panel 500B of front cover 300 and flexible front display panel 600A of second cover 301 as in step 1806. It should be appreciated that when front panel 500A was deactivated, the information or data viewable therein, initially depicted in FIG. 10, was reoriented automatically so as to be redisplayed on rear display panel 500B such that it is identically viewable as it was previously on front display panel 500A, and is now depicted in FIG. 11. It should be further appreciated that display panel 600A, by virtue of activation, is capable of displaying viewable information or data, also shown in FIG. 11.

In step 1805, if display control circuit 200 determines that second cover 301 is not in the closed position, display control circuit 200 deactivates display panel 500A, the flexible front display panel of front cover 300. Further, display control circuit 200 then activates rear display panel 500B of front cover 300. Concurrently, display control circuit 200 deactivates display panel 600A, the flexible front display panel of second cover 301, and simultaneously activates flexible rear display panel 600B of second cover 301. Additionally, display control circuit 200 also activates display screen 700, coupled to palmtop computer 100, as in step 1807.

In step 1807, it should be appreciated that the information or data originally viewable on front display panel 500A, which in one embodiment is a monthly calendar, e.g., the month of September, was reoriented by display control circuit 200 and enabled to be viewable on rear display panel 500B. It should be further appreciated that the information or data originally viewable on front display panel 600A, which in one embodiment is a monthly calendar, e.g., the month of October, was reoriented by display control circuit 200 and enabled to be viewable on display screen 700. It should be additionally appreciated that display control circuit 200 activated rear display panel 600B to viewably display additional information or data, which in one example is a monthly calendar, e.g., the month of November. This current embodiment of the present invention is depicted in FIG. 12.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A display apparatus for providing multi-sided viewing functionality to a portable electronic device, said apparatus comprising:
   a) a front cover mechanically and electrically coupled to said portable electronic device, said front cover comprising a hinge;
   b) a first display having multi-sided viewing functionality coupled to said front cover; and
   c) a display control circuit for enabling said first display, said display control circuit coupled to said portable electronic device, said display control circuit responsive to the orientation of said front cover, wherein when said front cover is moved from a closed position to an open position, information displayed on a first viewing side of said first display is automatically transferred to a second viewing side of said first display.

2. The display apparatus of claim 1 wherein said hinging of said front cover is adapted to open and close said front cover, such that when said front cover is open, said front cover is in an open position, and when said front cover is closed, said front cover is in a default position, and wherein said first viewing side is a front display portion and wherein said second viewing side is a rear display portion.

3. The display apparatus of claim 2 wherein said display control circuit, responsive to said default position of said front cover, activates said front display portion of said first display of said front cover, to enable viewing functionality of said front display portion of said first display while said display control circuit deactivates said rear display portion of said first display of said front cover.

4. The display apparatus of claim 2 further comprising:
   a second display comprising a front display portion and a rear display portion, coupled to said portable electronic device, wherein said display control circuit, responsive to said open position of said front cover, activates said rear display portion of said first display of said front cover and said front display portion of said second display of said electronic device, to enable viewing functionality of said rear display portion of said first display and said front display portion of said second display while said display control circuit deactivates said front display portion of said first display of said front cover.

5. The display apparatus of claim 1 further comprising:
   a second display, coupled to said portable electronic device, wherein said display control circuit responsive to the orientation of said front cover activates said second display when said front cover is moved from said closed position to said open position.

6. The display apparatus of claim 5 wherein said first display and said second display comprise a front display portion and a rear display portion.

7. A two-sided display apparatus for providing multi-sided viewing for a portable electronic device, said apparatus comprising:
   a) a front cover mechanically and electrically coupled to said portable electronic device, said front cover comprising a hinge for providing opening and closing functionality to said front cover, wherein said closed front cover is a default position;

b) a first display coupled to said front cover, said first display having multi-sided viewing functionality comprising a front display panel and a rear display panel; and c) a display control circuit coupled to said portable electronic device, adapted to activate said first display, said display control circuit responsive to the orientation of said front cover, wherein when said front cover is moved from a closed position to an open position, information displayed on a first viewing side of said first display is transferred automatically to a second viewing side of said first display.

8. The display apparatus of claim 7 further comprising:

a second display, coupled to said portable electronic device, said second display having multi-sided viewing functionality comprising a front display panel and a rear display panel, wherein said display control circuit activates said second display when said front cover is moved from said closed position to said open position.

9. The display apparatus of claim 8 wherein said first display and said second display comprise a thin flexible transparent material, said thin flexible transparent material analogous to mylar.

10. The display apparatus of claim 9 wherein said transparent material comprises a first layer and a second layer, said first layer and said second layer coupled to each other, such that they create a sealed chamber.

11. The display apparatus of claim 10 wherein said sealed chamber comprises a first transparent conducting layer and a second transparent conducting layer disposed within said sealed chamber, said first transparent conductive layer and said second transparent layer responsive to voltage applied by said display control circuit.

12. The display apparatus of claim 11 wherein said first transparent conducting layer and said second transparent conducting layer are idium tin oxide.

13. The display apparatus of claim 12 wherein said first transparent conducting layer is disposed toward said front display portion and said second transparent conducting layer is disposed toward said rear display portion.

14. The display apparatus of claim 10 wherein said sealed chamber is predominately filled with said first colored liquid.

15. The display apparatus of claim 10 wherein said sealed chamber further comprises a fluid, said fluid comprising a first colored liquid and a, at least, second colored liquid.

16. The display apparatus of claim 15 wherein said first colored liquid is white ink.

17. The display apparatus of claim 15 wherein said second colored liquid is black ink.

18. The display apparatus of claim 17 wherein said black ink is transparently encapsulated by a multisided viewing display.

19. The display apparatus of claim 18 wherein said transparently encapsulated black ink is electrostatically charged.

20. The display apparatus of claim 19 wherein said transparently encapsulated black ink is attracted to said voltage provided by said display control circuit, said voltage is more positive voltage.

21. A portable electronic device comprising:

a housing;

a flippable cover hinged to said housing and having an open state and a closed state, said flippable cover comprising a flexible first display having multi-sided viewing functionality comprising a front display panel and a back display panel; wherein said front display panel is operable to display information provided said flippable cover is in said closed state; and wherein further upon said flippable cover opening to said open state, said front display panel becomes deactivated, said back display panel automatically becomes activated and displays said information.

22. A portable electronic device as described in claim 21, wherein said housing support a second display, and wherein said display control circuit, upon said flippable cover opening to said open state, activates said second display for displaying additional information.

23. A portable electronic device as described in claim 22 wherein said first and said second display are flat panel display screens.

24. A portable electronic device as described in claim 23 wherein said flat panel display screens comprise electronic ink technology.

25. A portable electronic device comprising:

a housing supporting a first display;

a first flippable cover hinged to said housing and having an open state and a closed state, said first flippable cover comprising a second flexible display having multi-sided viewing functionality comprising a front display panel and a back display panel;

a second flippable cover hinged to said housing opposite to said first flippable cover and having an open state and a closed state, said second flippable cover comprising a third flexible display having multi-sided viewing functionality comprising a front display panel and a back display panel; wherein said front display panel of said second cover is active to display a first set of information provided said first and second covers are closed; and wherein further, upon said second cover opening, said front display panel of said second cover becomes deactivated, said back display panel of said second cover becomes activated and displays said first set of information and said front display panel of said first cover becomes activated for the display of second set of information; and wherein further, upon said first cover opening while said second cover is open, said front display panel of said first cover becomes deactivated, said back display panel of said first cover becomes activated and displays said second set of information and said first display becomes activated to display a third set of information.

26. A portable electronic device as described in claim 25 wherein said first and said second and said third display are flat panel display screens.

27. A portable electronic device as described in claim 26 wherein said flat panel display screens comprise electronic ink technology.

28. In a portable electronic device configured with a flexible cover mounted display having multi-sided viewing functionality comprising a first and a second side, a method for utilizing multiple display capabilities, said method comprising:

a) powering on said portable electronic device, such that said flexible cover mounted display having multi-sided viewing functionality comprising said first and said second side are operable to display a first set of information; and b) opening said flexible cover so as to automatically deactivate said first side and to automatically activate said second side of said flexible cover, to display said first set of information.

* * * * *